(12) United States Patent
Ryan

(10) Patent No.: US 8,707,034 B1
(45) Date of Patent: Apr. 22, 2014

(54) METHOD AND SYSTEM FOR USING REMOTE HEADERS TO SECURE ELECTRONIC FILES

(75) Inventor: Nicholas M. Ryan, Sunnyvale, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 2206 days.

(21) Appl. No.: 10/448,806

(22) Filed: May 30, 2003

(51) Int. Cl.
  *H04L 29/06* (2006.01)
(52) U.S. Cl.
  USPC .......................... 713/165; 713/193; 707/784
(58) Field of Classification Search
  None
  See application file for complete search history.

(56) References Cited

U.S. PATENT DOCUMENTS

| | | | |
|---|---|---|---|
| 4,238,854 A | 12/1980 | Ehrsam et al. | |
| 4,423,387 A | 12/1983 | Sempel | |
| 4,734,568 A | 3/1988 | Watanabe | |
| 4,757,533 A | 7/1988 | Allen et al. | |
| 4,796,220 A | 1/1989 | Wolfe | |
| 4,799,258 A | 1/1989 | Davies | |
| 4,827,508 A | 5/1989 | Shear | |
| 4,887,204 A | 12/1989 | Johnson et al. | |
| 4,888,800 A | 12/1989 | Marshall et al. | |
| 4,912,552 A | 3/1990 | Allison et al. | |
| 4,972,472 A | 11/1990 | Brown et al. | |
| 5,032,979 A | 7/1991 | Hecht et al. | |
| 5,052,040 A | 9/1991 | Preston et al. | |
| 5,058,164 A | 10/1991 | Elmer et al. | |
| 5,144,660 A | 9/1992 | Rose | |
| 5,204,897 A | 4/1993 | Wyman | |
| 5,212,788 A | 5/1993 | Lomet et al. | |
| 5,220,657 A | 6/1993 | Bly et al. | |
| 5,235,641 A | 8/1993 | Nozawa et al. | |
| 5,247,575 A | 9/1993 | Sprague et al. | |
| 5,267,313 A | 11/1993 | Hirata | |
| 5,276,735 A | 1/1994 | Boebert et al. | |
| 5,301,247 A | 4/1994 | Rasmussen et al. | |
| 5,319,705 A | 6/1994 | Halter et al. | |
| 5,369,702 A | 11/1994 | Shanton | |
| 5,375,169 A | 12/1994 | Seheidt et al. | |
| 5,404,404 A | 4/1995 | Novorita | |

(Continued)

FOREIGN PATENT DOCUMENTS

| | | | |
|---|---|---|---|
| EP | 0 672 991 A2 | 9/1995 | |
| EP | 0 674 253 A1 | 9/1995 | |

(Continued)

OTHER PUBLICATIONS

Expiration Mechanism for Chipcards, IBM Technical Disclosure Bulletin, Oct. 1, 2001, UK.

(Continued)

*Primary Examiner* — Nadia Khoshnoodi
(74) *Attorney, Agent, or Firm* — Sterne, Kessler, Goldstein & Fox P.L.L.C.

(57) ABSTRACT

An improved file security system that manages secured files (documents) is disclosed. The file security system provides centralized management and storage of security information that can be referenced by secured files. In other words, a secured file need not itself contain security information that is needed to determine whether access to the secured file is to be permitted. That is, at least a portion of the security information can be remotely stored and accessed by way of an identifier that is provided within the secured file. By centralizing storage of security information, the file security system is able to subsequently modify access criteria for secured files (documents) without having to physically make modifications to the secured files.

28 Claims, 9 Drawing Sheets

(56) References Cited

U.S. PATENT DOCUMENTS

| | | | |
|---|---|---|---|
| 5,406,628 A | 4/1995 | Beller et al. | |
| 5,414,852 A | 5/1995 | Kramer et al. | |
| 5,434,918 A | 7/1995 | Kung et al. | |
| 5,461,710 A | 10/1995 | Bloomfield et al. | |
| 5,467,342 A | 11/1995 | Logston et al. | |
| 5,495,533 A * | 2/1996 | Linehan et al. | 713/155 |
| 5,497,422 A | 3/1996 | Tysen et al. | |
| 5,499,297 A | 3/1996 | Boebert | |
| 5,502,766 A | 3/1996 | Boebert et al. | |
| 5,535,375 A | 7/1996 | Eshel et al. | |
| 5,557,765 A | 9/1996 | Lipner et al. | |
| 5,570,108 A | 10/1996 | McLaughlin et al. | |
| 5,584,023 A | 12/1996 | Hsu | |
| 5,600,722 A | 2/1997 | Yamaguchi et al. | |
| 5,606,663 A | 2/1997 | Kadooka | |
| 5,619,576 A | 4/1997 | Shaw | |
| 5,638,501 A | 6/1997 | Gough et al. | |
| 5,640,388 A | 6/1997 | Woodhead et al. | |
| 5,655,119 A | 8/1997 | Davy | |
| 5,661,668 A | 8/1997 | Yemini et al. | |
| 5,661,806 A | 8/1997 | Nevoux et al. | |
| 5,671,412 A | 9/1997 | Christiano | |
| 5,673,316 A | 9/1997 | Auerbach et al. | |
| 5,677,953 A | 10/1997 | Dolphin | |
| 5,680,452 A | 10/1997 | Shanton | |
| 5,682,537 A | 10/1997 | Davies et al. | |
| 5,684,987 A | 11/1997 | Mamiya et al. | |
| 5,689,688 A | 11/1997 | Strong et al. | |
| 5,689,718 A | 11/1997 | Sakurai et al. | |
| 5,699,428 A | 12/1997 | McDonnal et al. | |
| 5,708,709 A | 1/1998 | Rose | |
| 5,715,403 A | 2/1998 | Stefik | |
| 5,717,755 A | 2/1998 | Shanton | |
| 5,719,941 A | 2/1998 | Swift et al. | |
| 5,720,033 A | 2/1998 | Deo | |
| 5,729,734 A | 3/1998 | Parker et al. | |
| 5,732,265 A | 3/1998 | Dewitt et al. | |
| 5,745,573 A | 4/1998 | Lipner et al. | |
| 5,745,750 A | 4/1998 | Porcaro | |
| 5,748,736 A | 5/1998 | Mittra | |
| 5,751,287 A | 5/1998 | Hahn et al. | |
| 5,757,920 A | 5/1998 | Misra et al. | |
| 5,765,152 A | 6/1998 | Ericson | |
| 5,768,381 A | 6/1998 | Hawthorne | |
| 5,778,065 A | 7/1998 | Hauser et al. | |
| 5,778,350 A | 7/1998 | Adams et al. | |
| 5,781,711 A | 7/1998 | Austin et al. | |
| 5,787,169 A | 7/1998 | Eldridge et al. | |
| 5,787,173 A | 7/1998 | Seheidt et al. | |
| 5,787,175 A | 7/1998 | Carter | |
| 5,790,789 A | 8/1998 | Suarez | |
| 5,790,790 A | 8/1998 | Smith et al. | |
| 5,813,009 A | 9/1998 | Johnson et al. | |
| 5,821,933 A | 10/1998 | Keller et al. | |
| 5,825,876 A | 10/1998 | Peterson | |
| 5,835,592 A | 11/1998 | Chang et al. | |
| 5,835,601 A | 11/1998 | Shimbo et al. | |
| 5,850,443 A * | 12/1998 | Van Oorschot et al. | 380/285 |
| 5,857,189 A | 1/1999 | Riddle | |
| 5,862,325 A | 1/1999 | Reed et al. | |
| 5,870,468 A | 2/1999 | Harrison | |
| 5,870,477 A | 2/1999 | Sasaki et al. | |
| 5,881,287 A | 3/1999 | Mast | |
| 5,892,900 A | 4/1999 | Ginter et al. | |
| 5,893,084 A | 4/1999 | Morgan et al. | |
| 5,898,781 A | 4/1999 | Shanton | |
| 5,922,073 A | 7/1999 | Shimada | |
| 5,923,754 A | 7/1999 | Angelo et al. | |
| 5,933,498 A | 8/1999 | Schnek et al. | |
| 5,944,794 A | 8/1999 | Okamoto et al. | |
| 5,953,419 A | 9/1999 | Lohstroh et al. | |
| 5,968,177 A | 10/1999 | Batten-Carew et al. | |
| 5,970,502 A | 10/1999 | Salkewicz et al. | |
| 5,978,802 A | 11/1999 | Hurvig | |
| 5,987,440 A | 11/1999 | O'Neil et al. | |
| 5,991,879 A | 11/1999 | Still | |
| 5,999,907 A | 12/1999 | Donner | |
| 6,011,847 A | 1/2000 | Follendore, III | |
| 6,014,730 A | 1/2000 | Ohtsu | |
| 6,023,506 A | 2/2000 | Ote et al. | |
| 6,031,584 A | 2/2000 | Gray | |
| 6,032,216 A | 2/2000 | Schmuck et al. | |
| 6,035,404 A | 3/2000 | Zhao | |
| 6,038,322 A | 3/2000 | Harkins | |
| 6,044,155 A | 3/2000 | Thomlinson et al. | |
| 6,055,314 A | 4/2000 | Spies et al. | |
| 6,058,424 A | 5/2000 | Dixon et al. | |
| 6,061,790 A | 5/2000 | Bodnar | |
| 6,069,957 A | 5/2000 | Richards | |
| 6,070,244 A | 5/2000 | Orchier et al. | |
| 6,085,323 A * | 7/2000 | Shimizu et al. | 713/150 |
| 6,088,717 A | 7/2000 | Reed et al. | |
| 6,088,805 A | 7/2000 | Davis et al. | |
| 6,098,056 A | 8/2000 | Rusnak et al. | |
| 6,101,507 A | 8/2000 | Cane et al. | |
| 6,105,131 A | 8/2000 | Carroll | |
| 6,122,630 A | 9/2000 | Strickler et al. | |
| 6,134,327 A | 10/2000 | Van Oorschot | |
| 6,134,658 A | 10/2000 | Multerer et al. | |
| 6,134,660 A | 10/2000 | Boneh et al. | |
| 6,134,664 A | 10/2000 | Walker | |
| 6,141,754 A | 10/2000 | Choy | |
| 6,145,084 A | 11/2000 | Zuili | |
| 6,148,338 A | 11/2000 | Lachelt et al. | |
| 6,158,010 A | 12/2000 | Moriconi et al. | |
| 6,161,139 A | 12/2000 | Win et al. | |
| 6,182,142 B1 | 1/2001 | Win et al. | |
| 6,185,684 B1 | 2/2001 | Pravetz et al. | |
| 6,192,408 B1 * | 2/2001 | Vahalia et al. | 709/229 |
| 6,199,070 B1 | 3/2001 | Polo-Wood et al. | |
| 6,205,549 B1 | 3/2001 | Pravetz et al. | |
| 6,212,561 B1 | 4/2001 | Sitaraman et al. | |
| 6,223,285 B1 | 4/2001 | Komuro et al. | |
| 6,226,618 B1 | 5/2001 | Downs et al. | |
| 6,240,188 B1 | 5/2001 | Dondeti et al. | |
| 6,249,755 B1 | 6/2001 | Yemini et al. | |
| 6,249,873 B1 | 6/2001 | Richard et al. | |
| 6,253,193 B1 | 6/2001 | Ginter et al. | |
| 6,260,040 B1 | 7/2001 | Kauffman et al. | |
| 6,260,141 B1 | 7/2001 | Park | |
| 6,263,348 B1 | 7/2001 | Kathrow et al. | |
| 6,266,420 B1 | 7/2001 | Langford et al. | |
| 6,272,631 B1 | 8/2001 | Thomlinson et al. | |
| 6,272,632 B1 | 8/2001 | Carman et al. | |
| 6,282,649 B1 | 8/2001 | Lambert et al. | |
| 6,289,450 B1 | 9/2001 | Pensak et al. | |
| 6,289,458 B1 | 9/2001 | Garg et al. | |
| 6,292,895 B1 | 9/2001 | Baltzley | |
| 6,292,899 B1 | 9/2001 | McBride | |
| 6,295,361 B1 | 9/2001 | Kadansky et al. | |
| 6,299,069 B1 | 10/2001 | Shona | |
| 6,301,614 B1 | 10/2001 | Najork et al. | |
| 6,308,256 B1 | 10/2001 | Folmsbee | |
| 6,308,273 B1 | 10/2001 | Goertzel et al. | |
| 6,314,408 B1 | 11/2001 | Salas et al. | |
| 6,314,409 B2 | 11/2001 | Schneck et al. | |
| 6,317,777 B1 | 11/2001 | Skarbo et al. | |
| 6,332,025 B2 * | 12/2001 | Takahashi et al. | 380/281 |
| 6,336,114 B1 | 1/2002 | Garrison | |
| 6,339,423 B1 | 1/2002 | Sampson et al. | |
| 6,339,825 B2 | 1/2002 | Pensak et al. | |
| 6,341,164 B1 | 1/2002 | Dilkie et al. | |
| 6,343,316 B1 | 1/2002 | Sakata | |
| 6,347,374 B1 | 2/2002 | Drake et al. | |
| 6,349,337 B1 | 2/2002 | Parsons et al. | |
| 6,351,813 B1 | 2/2002 | Mooney et al. | |
| 6,356,903 B1 | 3/2002 | Baxter et al. | |
| 6,356,941 B1 | 3/2002 | Cohen | |
| 6,357,010 B1 | 3/2002 | Viets et al. | |
| 6,363,480 B1 | 3/2002 | Perlman | |
| 6,366,298 B1 | 4/2002 | Haitsuka et al. | |
| 6,370,249 B1 | 4/2002 | Van Oorschot | |
| 6,381,698 B1 | 4/2002 | Devanbu et al. | |
| 6,385,644 B1 | 5/2002 | Devine et al. | |

(56) References Cited

U.S. PATENT DOCUMENTS

| | | |
|---|---|---|
| 6,389,433 B1 | 5/2002 | Bolosky et al. |
| 6,389,538 B1 | 5/2002 | Gruse et al. |
| 6,393,420 B1 | 5/2002 | Peters |
| 6,405,315 B1 | 6/2002 | Burns et al. |
| 6,405,318 B1 | 6/2002 | Rowland |
| 6,408,404 B1 | 6/2002 | Ladwig |
| 6,421,714 B1 | 7/2002 | Rai et al. |
| 6,442,688 B1 | 8/2002 | Moses et al. |
| 6,442,695 B1 | 8/2002 | Dutcher et al. |
| 6,446,090 B1 | 9/2002 | Hart |
| 6,449,721 B1 | 9/2002 | Pensak et al. |
| 6,453,353 B1 | 9/2002 | Win et al. |
| 6,453,419 B1 | 9/2002 | Flint et al. |
| 6,466,476 B1 | 10/2002 | Wong et al. |
| 6,466,932 B1 | 10/2002 | Dennis et al. |
| 6,477,544 B1 | 11/2002 | Bolosky et al. |
| 6,487,662 B1 | 11/2002 | Kharon et al. |
| 6,490,680 B1 | 12/2002 | Scheidt et al. |
| 6,505,300 B2 | 1/2003 | Chan et al. |
| 6,510,349 B1 | 1/2003 | Schneck et al. |
| 6,519,700 B1 | 2/2003 | Ram et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |
| 6,549,623 B1 | 4/2003 | Scheidt et al. |
| 6,550,011 B1 | 4/2003 | Sims |
| 6,557,039 B1 | 4/2003 | Leong et al. |
| 6,567,914 B1 | 5/2003 | Just et al. |
| 6,571,291 B1 | 5/2003 | Chow |
| 6,574,733 B1 | 6/2003 | Langford |
| 6,584,466 B1 | 6/2003 | Serbinis et al. |
| 6,587,878 B1 | 7/2003 | Merriam |
| 6,587,946 B1 | 7/2003 | Jakobsson |
| 6,588,673 B1 | 7/2003 | Chan et al. |
| 6,591,295 B1 | 7/2003 | Diamond et al. |
| 6,594,662 B1 | 7/2003 | Sieffert et al. |
| 6,598,161 B1 | 7/2003 | Kluttz et al. |
| 6,601,170 B1 | 7/2003 | Wallace, Jr. |
| 6,603,857 B1 | 8/2003 | Batten-Carew et al. |
| 6,608,636 B1 | 8/2003 | Roseman |
| 6,611,599 B2 | 8/2003 | Natarajan |
| 6,611,846 B1 | 8/2003 | Stoodley |
| 6,615,349 B1 | 9/2003 | Hair |
| 6,615,350 B1 | 9/2003 | Schell et al. |
| 6,625,650 B2 | 9/2003 | Stelliga |
| 6,625,734 B1 | 9/2003 | Marvit et al. |
| 6,629,140 B1 | 9/2003 | Fertell et al. |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 | 11/2003 | Numao et al. |
| 6,678,835 B1 | 1/2004 | Shah et al. |
| 6,683,954 B1 | 1/2004 | Searle et al. |
| 6,687,822 B1 | 2/2004 | Jakobsson |
| 6,693,652 B1 | 2/2004 | Barrus et al. |
| 6,698,022 B1 | 2/2004 | Wu |
| 6,711,683 B1 | 3/2004 | Laczko et al. |
| 6,718,361 B1 | 4/2004 | Basani et al. |
| 6,735,701 B1 | 5/2004 | Jacobson |
| 6,738,908 B1 | 5/2004 | Bonn et al. |
| 6,751,573 B1 | 6/2004 | Burch |
| 6,754,657 B2 | 6/2004 | Lomet |
| 6,754,665 B1 | 6/2004 | Futagami et al. |
| 6,775,779 B1 | 8/2004 | England et al. |
| 6,779,031 B1 | 8/2004 | Picher-Dempsey |
| 6,782,403 B1 | 8/2004 | Kino et al. |
| 6,801,999 B1 | 10/2004 | Venkatesan et al. |
| 6,807,534 B1 * | 10/2004 | Erickson ................. 705/51 |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,816,969 B2 | 11/2004 | Miyazaki et al. |
| 6,826,698 B1 | 11/2004 | Minkin et al. |
| 6,834,333 B2 | 12/2004 | Yoshino et al. |
| 6,834,341 B1 | 12/2004 | Bahl et al. |
| 6,842,825 B2 | 1/2005 | Geiner et al. |
| 6,845,452 B1 | 1/2005 | Roddy et al. |
| 6,851,050 B2 | 2/2005 | Singhal et al. |
| 6,862,103 B1 | 3/2005 | Miura et al. |
| 6,865,555 B2 | 3/2005 | Novak |
| 6,870,920 B2 | 3/2005 | Henits |
| 6,874,139 B2 | 3/2005 | Krueger et al. |
| 6,877,010 B2 | 4/2005 | Smith-Semedo et al. |
| 6,877,136 B2 | 4/2005 | Bess et al. |
| 6,882,994 B2 | 4/2005 | Yoshimura et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,898,627 B1 | 5/2005 | Sekiguchi |
| 6,907,034 B1 | 6/2005 | Begis |
| 6,909,708 B1 | 6/2005 | Krishnaswamy et al. |
| 6,915,425 B2 | 7/2005 | Xu et al. |
| 6,915,434 B1 | 7/2005 | Kuroda et al. |
| 6,915,435 B1 | 7/2005 | Merriam |
| 6,920,558 B2 | 7/2005 | Sames et al. |
| 6,922,785 B1 | 7/2005 | Brewer et al. |
| 6,924,425 B2 | 8/2005 | Naples et al. |
| 6,931,450 B2 | 8/2005 | Howard et al. |
| 6,931,530 B2 | 8/2005 | Pham et al. |
| 6,931,597 B1 | 8/2005 | Prakash |
| 6,938,042 B2 | 8/2005 | Aboulhosn et al. |
| 6,938,156 B2 | 8/2005 | Wheeler et al. |
| 6,941,355 B1 | 9/2005 | Donaghey et al. |
| 6,941,456 B2 | 9/2005 | Wilson |
| 6,941,472 B2 | 9/2005 | Moriconi et al. |
| 6,944,183 B1 | 9/2005 | Iyer et al. |
| 6,947,556 B1 * | 9/2005 | Matyas et al. ................. 380/29 |
| 6,950,818 B2 | 9/2005 | Dennis et al. |
| 6,950,936 B2 | 9/2005 | Subramaniam et al. |
| 6,950,941 B1 | 9/2005 | Lee et al. |
| 6,950,943 B1 | 9/2005 | Bacha et al. |
| 6,952,780 B2 | 10/2005 | Olsen et al. |
| 6,957,261 B2 | 10/2005 | Lortz |
| 6,959,308 B2 | 10/2005 | Gramsamer et al. |
| 6,961,849 B1 | 11/2005 | Davis et al. |
| 6,961,855 B1 | 11/2005 | Rich et al. |
| 6,968,060 B1 | 11/2005 | Pinkas |
| 6,968,456 B1 | 11/2005 | Tripathi et al. |
| 6,971,018 B1 | 11/2005 | Witt et al. |
| 6,976,259 B1 | 12/2005 | Dutta et al. |
| 6,978,366 B1 | 12/2005 | Ignatchenko et al. |
| 6,978,376 B2 | 12/2005 | Giroux et al. |
| 6,978,377 B1 | 12/2005 | Asano et al. |
| 6,987,752 B1 | 1/2006 | Falco et al. |
| 6,988,133 B1 | 1/2006 | Zavalkovsky et al. |
| 6,988,199 B2 | 1/2006 | Toh et al. |
| 6,990,441 B1 | 1/2006 | Bolme et al. |
| 6,993,135 B2 | 1/2006 | Ishibashi |
| 6,996,718 B1 | 2/2006 | Henry et al. |
| 7,000,150 B1 | 2/2006 | Zunino et al. |
| 7,003,116 B2 | 2/2006 | Riedel et al. |
| 7,003,117 B2 | 2/2006 | Kacker et al. |
| 7,003,560 B1 | 2/2006 | Mullen et al. |
| 7,003,661 B2 | 2/2006 | Beattie et al. |
| 7,010,689 B1 | 3/2006 | Matyas et al. |
| 7,010,809 B2 | 3/2006 | Hori et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,043,637 B2 | 5/2006 | Bolosky et al. |
| 7,046,807 B2 | 5/2006 | Hirano et al. |
| 7,047,404 B1 | 5/2006 | Doonan et al. |
| 7,051,213 B1 | 5/2006 | Kobayashi et al. |
| 7,058,696 B1 | 6/2006 | Phillips et al. |
| 7,058,978 B2 | 6/2006 | Feuerstein et al. |
| 7,073,063 B2 | 7/2006 | Peinado |
| 7,073,073 B1 | 7/2006 | Nonaka et al. |

(56) References Cited

U.S. PATENT DOCUMENTS

| | | | |
|---|---|---|---|
| 7,076,067 B2 | 7/2006 | Raike et al. | |
| 7,076,312 B2 | 7/2006 | Law et al. | |
| 7,076,469 B2 | 7/2006 | Schreiber et al. | |
| 7,076,633 B2 | 7/2006 | Tormasov et al. | |
| 7,080,077 B2 | 7/2006 | Ramamurthy et al. | |
| 7,095,853 B2 | 8/2006 | Morishita | |
| 7,096,266 B2 | 8/2006 | Lewin et al. | |
| 7,099,926 B1 | 8/2006 | Ims et al. | |
| 7,103,911 B2 | 9/2006 | Spies et al. | |
| 7,107,185 B1 | 9/2006 | Yemini et al. | |
| 7,107,269 B2 | 9/2006 | Arlein et al. | |
| 7,107,416 B2 | 9/2006 | Stuart et al. | |
| 7,113,594 B2 | 9/2006 | Boneh et al. | |
| 7,116,785 B2 * | 10/2006 | Okaue | 380/278 |
| 7,117,322 B2 | 10/2006 | Hochberg et al. | |
| 7,120,635 B2 | 10/2006 | Bhide et al. | |
| 7,120,757 B2 | 10/2006 | Tsuge | |
| 7,124,164 B1 | 10/2006 | Chemtob | |
| 7,126,957 B1 | 10/2006 | Isukapalli et al. | |
| 7,130,964 B2 | 10/2006 | Ims et al. | |
| 7,131,071 B2 | 10/2006 | Gune et al. | |
| 7,134,041 B2 | 11/2006 | Murray et al. | |
| 7,136,903 B1 * | 11/2006 | Phillips et al. | 709/217 |
| 7,139,399 B1 | 11/2006 | Zimmermann | |
| 7,140,044 B2 | 11/2006 | Redlich et al. | |
| 7,145,898 B1 | 12/2006 | Elliott | |
| 7,146,388 B2 | 12/2006 | Stakutis et al. | |
| 7,146,498 B1 | 12/2006 | Takechi et al. | |
| 7,159,036 B2 | 1/2007 | Hinchliffe et al. | |
| 7,168,094 B1 | 1/2007 | Fredell | |
| 7,171,557 B2 | 1/2007 | Kallahalla et al. | |
| 7,174,563 B1 | 2/2007 | Brownlie et al. | |
| 7,177,427 B1 | 2/2007 | Komuro et al. | |
| 7,177,839 B1 | 2/2007 | Claxton et al. | |
| 7,178,033 B1 | 2/2007 | Garcia | |
| 7,181,017 B1 | 2/2007 | Nagel et al. | |
| 7,185,364 B2 | 2/2007 | Knouse et al. | |
| 7,187,033 B2 | 3/2007 | Pendharkar | |
| 7,188,181 B1 | 3/2007 | Squier et al. | |
| 7,194,764 B2 | 3/2007 | Martherus et al. | |
| 7,197,638 B1 | 3/2007 | Grawrock et al. | |
| 7,200,747 B2 | 4/2007 | Riedel et al. | |
| 7,203,317 B2 | 4/2007 | Kallahalla et al. | |
| 7,203,968 B2 | 4/2007 | Asano et al. | |
| 7,219,230 B2 | 5/2007 | Riedel et al. | |
| 7,224,795 B2 | 5/2007 | Takada et al. | |
| 7,225,256 B2 | 5/2007 | Villavicencio | |
| 7,227,953 B2 | 6/2007 | Shida | |
| 7,233,948 B1 | 6/2007 | Shamoon et al. | |
| 7,237,002 B1 | 6/2007 | Estrada et al. | |
| 7,249,044 B2 | 7/2007 | Kumar et al. | |
| 7,249,251 B2 | 7/2007 | Todd et al. | |
| 7,260,555 B2 | 8/2007 | Rossmann et al. | |
| 7,265,764 B2 | 9/2007 | Alben et al. | |
| 7,266,684 B2 | 9/2007 | Jancula | |
| 7,280,658 B2 | 10/2007 | Amini et al. | |
| 7,281,272 B1 | 10/2007 | Rubin et al. | |
| 7,287,055 B2 | 10/2007 | Smith et al. | |
| 7,287,058 B2 | 10/2007 | Loveland et al. | |
| 7,290,148 B2 | 10/2007 | Tozawa et al. | |
| 7,308,702 B1 | 12/2007 | Thomsen et al. | |
| 7,313,824 B1 | 12/2007 | Bala et al. | |
| 7,319,752 B2 | 1/2008 | Asano et al. | |
| 7,340,600 B1 | 3/2008 | Corella | |
| 7,343,488 B2 | 3/2008 | Yadav | |
| 7,359,517 B1 | 4/2008 | Rowe | |
| 7,362,868 B2 | 4/2008 | Madoukh et al. | |
| 7,380,120 B1 | 5/2008 | Garcia | |
| 7,383,586 B2 | 6/2008 | Cross et al. | |
| 7,386,529 B2 | 6/2008 | Kiessig et al. | |
| 7,386,599 B1 | 6/2008 | Piersol et al. | |
| 7,401,220 B2 | 7/2008 | Bolosky et al. | |
| 7,406,596 B2 | 7/2008 | Tararukhina et al. | |
| 7,415,608 B2 | 8/2008 | Bolosky et al. | |
| 7,434,048 B1 | 10/2008 | Shapiro et al. | |
| 7,454,612 B2 | 11/2008 | Bolosky et al. | |
| 7,461,157 B2 | 12/2008 | Ahlard et al. | |
| 7,461,405 B2 | 12/2008 | Boudreault et al. | |
| 7,478,243 B2 | 1/2009 | Bolosky et al. | |
| 7,478,418 B2 | 1/2009 | Supramaniam et al. | |
| 7,484,245 B1 | 1/2009 | Friedman et al. | |
| 7,496,959 B2 | 2/2009 | Adelstein et al. | |
| 7,509,492 B2 | 3/2009 | Boyen et al. | |
| 7,512,810 B1 | 3/2009 | Ryan | |
| 7,539,867 B2 | 5/2009 | Bolosky et al. | |
| 7,555,558 B1 | 6/2009 | Kenrich et al. | |
| 7,562,232 B2 | 7/2009 | Zuili et al. | |
| 7,565,683 B1 | 7/2009 | Huang et al. | |
| 7,631,184 B2 | 12/2009 | Ryan | |
| 7,681,034 B1 | 3/2010 | Lee et al. | |
| 7,698,230 B1 | 4/2010 | Brown et al. | |
| 7,702,909 B2 | 4/2010 | Vainstein | |
| 7,703,140 B2 | 4/2010 | Nath et al. | |
| 7,707,427 B1 | 4/2010 | Kenrich et al. | |
| 7,729,995 B1 | 6/2010 | Alain et al. | |
| 7,730,543 B1 | 6/2010 | Nath et al. | |
| 7,748,045 B2 | 6/2010 | Kenrich et al. | |
| 2001/0000265 A1 | 4/2001 | Schreiber et al. | |
| 2001/0011254 A1 | 8/2001 | Clark | |
| 2001/0018743 A1 | 8/2001 | Morishita | |
| 2001/0021255 A1 | 9/2001 | Ishibashi | |
| 2001/0021926 A1 | 9/2001 | Schneck et al. | |
| 2001/0023421 A1 | 9/2001 | Numao et al. | |
| 2001/0032181 A1 | 10/2001 | Jakstadt et al. | |
| 2001/0033611 A1 | 10/2001 | Grimwood et al. | |
| 2001/0034839 A1 | 10/2001 | Karjoth et al. | |
| 2001/0042110 A1 | 11/2001 | Furusawa et al. | |
| 2001/0044903 A1 | 11/2001 | Yamamoto et al. | |
| 2001/0056541 A1 * | 12/2001 | Matsuzaki et al. | 713/193 |
| 2001/0056550 A1 | 12/2001 | Lee | |
| 2002/0003886 A1 | 1/2002 | Hillegass et al. | |
| 2002/0007335 A1 | 1/2002 | Millard et al. | |
| 2002/0010679 A1 | 1/2002 | Felsher | |
| 2002/0013772 A1 | 1/2002 | Peinado | |
| 2002/0016921 A1 | 2/2002 | Olsen et al. | |
| 2002/0016922 A1 | 2/2002 | Richards et al. | |
| 2002/0023208 A1 | 2/2002 | Jancula | |
| 2002/0026321 A1 | 2/2002 | Faris et al. | |
| 2002/0027886 A1 | 3/2002 | Fischer et al. | |
| 2002/0029340 A1 | 3/2002 | Pensak et al. | |
| 2002/0031230 A1 | 3/2002 | Sweet et al. | |
| 2002/0035624 A1 | 3/2002 | Kim | |
| 2002/0036984 A1 | 3/2002 | Chiussi et al. | |
| 2002/0041391 A1 | 4/2002 | Bannai | |
| 2002/0042756 A1 | 4/2002 | Kumar et al. | |
| 2002/0046350 A1 | 4/2002 | Lordemann et al. | |
| 2002/0050098 A1 | 5/2002 | Chan | |
| 2002/0052981 A1 | 5/2002 | Yasuda | |
| 2002/0056042 A1 | 5/2002 | Van Der Kaay et al. | |
| 2002/0062240 A1 | 5/2002 | Morinville | |
| 2002/0062245 A1 | 5/2002 | Niu et al. | |
| 2002/0062451 A1 | 5/2002 | Scheidt et al. | |
| 2002/0069077 A1 | 6/2002 | Brophy et al. | |
| 2002/0069272 A1 | 6/2002 | Kim et al. | |
| 2002/0069363 A1 | 6/2002 | Winburn | |
| 2002/0073320 A1 | 6/2002 | Rinkevich et al. | |
| 2002/0077986 A1 | 6/2002 | Kobata et al. | |
| 2002/0077988 A1 | 6/2002 | Sasaki et al. | |
| 2002/0078239 A1 | 6/2002 | Howard et al. | |
| 2002/0078361 A1 | 6/2002 | Giroux et al. | |
| 2002/0087479 A1 | 7/2002 | Malcolm | |
| 2002/0089602 A1 | 7/2002 | Sullivan | |
| 2002/0091532 A1 | 7/2002 | Viets et al. | |
| 2002/0091745 A1 | 7/2002 | Ramamurthy et al. | |
| 2002/0091928 A1 | 7/2002 | Bouchard et al. | |
| 2002/0093527 A1 | 7/2002 | Sherlock et al. | |
| 2002/0099947 A1 | 7/2002 | Evans | |
| 2002/0112035 A1 | 8/2002 | Carey et al. | |
| 2002/0112048 A1 | 8/2002 | Gruyer et al. | |
| 2002/0120851 A1 | 8/2002 | Clarke | |
| 2002/0124180 A1 | 9/2002 | Hagman | |
| 2002/0129158 A1 | 9/2002 | Zhang et al. | |
| 2002/0129235 A1 | 9/2002 | Okamoto et al. | |
| 2002/0133500 A1 | 9/2002 | Arlein et al. | |

(56) References Cited

U.S. PATENT DOCUMENTS

| | | |
|---|---|---|
| 2002/0133699 A1 | 9/2002 | Pueschel |
| 2002/0138571 A1 | 9/2002 | Trinon et al. |
| 2002/0138726 A1 | 9/2002 | Sames et al. |
| 2002/0138762 A1 | 9/2002 | Horne |
| 2002/0143710 A1 | 10/2002 | Liu |
| 2002/0143906 A1 | 10/2002 | Tormasov et al. |
| 2002/0150239 A1 | 10/2002 | Carny et al. |
| 2002/0152302 A1 | 10/2002 | Motoyama et al. |
| 2002/0156726 A1 | 10/2002 | Kleckner et al. |
| 2002/0157016 A1* | 10/2002 | Russell et al. ............ 713/200 |
| 2002/0162104 A1 | 10/2002 | Raike et al. |
| 2002/0165870 A1 | 11/2002 | Chakraborty et al. |
| 2002/0166053 A1 | 11/2002 | Wilson |
| 2002/0169963 A1 | 11/2002 | Seder et al. |
| 2002/0169965 A1 | 11/2002 | Hale et al. |
| 2002/0172367 A1 | 11/2002 | Mulder et al. |
| 2002/0174030 A1 | 11/2002 | Praisner et al. |
| 2002/0174109 A1 | 11/2002 | Chandy et al. |
| 2002/0174415 A1 | 11/2002 | Hines |
| 2002/0176572 A1 | 11/2002 | Ananth |
| 2002/0178271 A1 | 11/2002 | Graham et al. |
| 2002/0184217 A1 | 12/2002 | Bisbee et al. |
| 2002/0184488 A1 | 12/2002 | Amini et al. |
| 2002/0194484 A1 | 12/2002 | Bolosky et al. |
| 2002/0198798 A1 | 12/2002 | Ludwig et al. |
| 2003/0005168 A1 | 1/2003 | Leerssen et al. |
| 2003/0009685 A1 | 1/2003 | Choo et al. |
| 2003/0014391 A1 | 1/2003 | Evans et al. |
| 2003/0023559 A1 | 1/2003 | Choi et al. |
| 2003/0026431 A1 | 2/2003 | Hammersmith |
| 2003/0028610 A1 | 2/2003 | Pearson |
| 2003/0033528 A1 | 2/2003 | Ozog et al. |
| 2003/0037029 A1 | 2/2003 | Holenstein et al. |
| 2003/0037133 A1 | 2/2003 | Owens |
| 2003/0037237 A1 | 2/2003 | Abgrall et al. |
| 2003/0037253 A1 | 2/2003 | Blank et al. |
| 2003/0046176 A1 | 3/2003 | Hynes |
| 2003/0046238 A1* | 3/2003 | Nonaka et al. ............ 705/51 |
| 2003/0046270 A1 | 3/2003 | Leung et al. |
| 2003/0050919 A1 | 3/2003 | Brown et al. |
| 2003/0051039 A1 | 3/2003 | Brown et al. |
| 2003/0056139 A1 | 3/2003 | Murray et al. |
| 2003/0061482 A1 | 3/2003 | Emmerichs |
| 2003/0061506 A1 | 3/2003 | Cooper |
| 2003/0074580 A1 | 4/2003 | Knouse et al. |
| 2003/0078959 A1 | 4/2003 | Yeung et al. |
| 2003/0079175 A1 | 4/2003 | Limantsev |
| 2003/0081784 A1 | 5/2003 | Kallahalla et al. |
| 2003/0081785 A1 | 5/2003 | Boneh et al. |
| 2003/0081787 A1 | 5/2003 | Kallahalla et al. |
| 2003/0081790 A1 | 5/2003 | Kallahalla et al. |
| 2003/0088517 A1 | 5/2003 | Medoff |
| 2003/0088783 A1 | 5/2003 | DiPierro |
| 2003/0093457 A1 | 5/2003 | Goldick |
| 2003/0095552 A1 | 5/2003 | Bernhard et al. |
| 2003/0099248 A1 | 5/2003 | Speciner |
| 2003/0101072 A1 | 5/2003 | Dick et al. |
| 2003/0110169 A1 | 6/2003 | Zuili |
| 2003/0110266 A1 | 6/2003 | Rollins et al. |
| 2003/0110280 A1 | 6/2003 | Hinchliffe et al. |
| 2003/0110397 A1 | 6/2003 | Supramaniam |
| 2003/0115146 A1 | 6/2003 | Lee et al. |
| 2003/0115218 A1 | 6/2003 | Bobbitt et al. |
| 2003/0115570 A1 | 6/2003 | Bisceglia |
| 2003/0120601 A1 | 6/2003 | Ouye |
| 2003/0120684 A1 | 6/2003 | Zuili et al. |
| 2003/0126434 A1 | 7/2003 | Lim et al. |
| 2003/0132949 A1 | 7/2003 | Fallon et al. |
| 2003/0154296 A1 | 8/2003 | Noguchi et al. |
| 2003/0154381 A1 | 8/2003 | Ouye |
| 2003/0154396 A1 | 8/2003 | Godwin et al. |
| 2003/0154401 A1 | 8/2003 | Hartman et al. |
| 2003/0159048 A1 | 8/2003 | Matsumoto et al. |
| 2003/0159066 A1 | 8/2003 | Staw et al. |
| 2003/0165117 A1 | 9/2003 | Garcia-Luna-Aceves et al. |
| 2003/0172280 A1 | 9/2003 | Scheidt et al. |
| 2003/0177070 A1 | 9/2003 | Viswanath et al. |
| 2003/0177378 A1 | 9/2003 | Wittkotter |
| 2003/0182310 A1 | 9/2003 | Charnock et al. |
| 2003/0182579 A1 | 9/2003 | Leporini et al. |
| 2003/0182584 A1 | 9/2003 | Banes et al. |
| 2003/0191938 A1 | 10/2003 | Woods et al. |
| 2003/0196096 A1 | 10/2003 | Sutton |
| 2003/0197729 A1 | 10/2003 | Denoue et al. |
| 2003/0200202 A1 | 10/2003 | Hsiao et al. |
| 2003/0204692 A1 | 10/2003 | Tamer et al. |
| 2003/0208485 A1 | 11/2003 | Castellanos |
| 2003/0217264 A1 | 11/2003 | Martin et al. |
| 2003/0217281 A1 | 11/2003 | Ryan |
| 2003/0217282 A1 | 11/2003 | Henry |
| 2003/0217333 A1 | 11/2003 | Smith et al. |
| 2003/0220999 A1 | 11/2003 | Emerson |
| 2003/0222141 A1 | 12/2003 | Vogler et al. |
| 2003/0226013 A1 | 12/2003 | Dutertre |
| 2003/0233650 A1 | 12/2003 | Zaner et al. |
| 2004/0022390 A1* | 2/2004 | McDonald et al. ............ 380/277 |
| 2004/0025037 A1 | 2/2004 | Hair |
| 2004/0039781 A1 | 2/2004 | LaVallee et al. |
| 2004/0041845 A1 | 3/2004 | Alben et al. |
| 2004/0049702 A1 | 3/2004 | Subramaniam et al. |
| 2004/0064507 A1 | 4/2004 | Sakata et al. |
| 2004/0064710 A1 | 4/2004 | Vainstein |
| 2004/0068524 A1 | 4/2004 | Aboulhosn et al. |
| 2004/0068664 A1 | 4/2004 | Nachenberg et al. |
| 2004/0073660 A1 | 4/2004 | Toomey |
| 2004/0073718 A1 | 4/2004 | Johannessen et al. |
| 2004/0088548 A1 | 5/2004 | Smetters et al. |
| 2004/0098580 A1 | 5/2004 | DeTreville |
| 2004/0103202 A1 | 5/2004 | Hildebrand et al. |
| 2004/0103280 A1 | 5/2004 | Balfanz et al. |
| 2004/0117371 A1 | 6/2004 | Bhide et al. |
| 2004/0131191 A1 | 7/2004 | Chen et al. |
| 2004/0133544 A1 | 7/2004 | Kiessig et al. |
| 2004/0158586 A1 | 8/2004 | Tsai |
| 2004/0186845 A1 | 9/2004 | Fukui |
| 2004/0193602 A1 | 9/2004 | Liu et al. |
| 2004/0193905 A1 | 9/2004 | Lirov et al. |
| 2004/0193912 A1 | 9/2004 | Li et al. |
| 2004/0199514 A1 | 10/2004 | Rosenblatt et al. |
| 2004/0205576 A1 | 10/2004 | Chikirivao et al. |
| 2004/0215956 A1 | 10/2004 | Venkatachary et al. |
| 2004/0215962 A1 | 10/2004 | Douceur et al. |
| 2004/0243853 A1 | 12/2004 | Swander et al. |
| 2004/0254884 A1 | 12/2004 | Haber et al. |
| 2005/0021467 A1 | 1/2005 | Franzdonk |
| 2005/0021629 A1 | 1/2005 | Cannata et al. |
| 2005/0028006 A1 | 2/2005 | Leser et al. |
| 2005/0039034 A1 | 2/2005 | Doyle et al. |
| 2005/0050098 A1 | 3/2005 | Barnett |
| 2005/0071275 A1 | 3/2005 | Vainstein et al. |
| 2005/0071657 A1 | 3/2005 | Ryan |
| 2005/0071658 A1 | 3/2005 | Nath et al. |
| 2005/0081029 A1 | 4/2005 | Thornton et al. |
| 2005/0086531 A1 | 4/2005 | Kenrich |
| 2005/0091289 A1 | 4/2005 | Shappell et al. |
| 2005/0091484 A1 | 4/2005 | Thornton et al. |
| 2005/0097061 A1 | 5/2005 | Shapiro et al. |
| 2005/0120199 A1 | 6/2005 | Carter |
| 2005/0138371 A1 | 6/2005 | Supramaniam |
| 2005/0138383 A1 | 6/2005 | Vainstein |
| 2005/0168766 A1 | 8/2005 | Troyansky et al. |
| 2005/0177716 A1 | 8/2005 | Ginter et al. |
| 2005/0177858 A1 | 8/2005 | Ueda |
| 2005/0198326 A1 | 9/2005 | Schlimmer et al. |
| 2005/0223242 A1 | 10/2005 | Nath |
| 2005/0223414 A1 | 10/2005 | Kenrich et al. |
| 2005/0235154 A1 | 10/2005 | Serret-Avila |
| 2005/0256909 A1 | 11/2005 | Aboulhosn et al. |
| 2005/0268033 A1 | 12/2005 | Ogasawara et al. |
| 2005/0273600 A1 | 12/2005 | Seeman |
| 2005/0283610 A1 | 12/2005 | Serret-Avila et al. |
| 2005/0288961 A1 | 12/2005 | Tabrizi |
| 2006/0005021 A1 | 1/2006 | Torrubia-Saez |
| 2006/0075258 A1 | 4/2006 | Adamson et al. |

(56) References Cited

U.S. PATENT DOCUMENTS

| | | |
|---|---|---|
| 2006/0075465 A1 | 4/2006 | Ramanathan et al. |
| 2006/0093150 A1 | 5/2006 | Reddy et al. |
| 2006/0101285 A1 | 5/2006 | Chen et al. |
| 2006/0149407 A1 | 7/2006 | Markham et al. |
| 2006/0168147 A1 | 7/2006 | Inoue et al. |
| 2006/0184637 A1* | 8/2006 | Hultgren et al. ............ 709/216 |
| 2006/0230437 A1 | 10/2006 | Boyer et al. |
| 2006/0277316 A1 | 12/2006 | Wang et al. |
| 2007/0006214 A1 | 1/2007 | Dubal et al. |
| 2007/0067837 A1 | 3/2007 | Schuster |
| 2007/0083575 A1 | 4/2007 | Leung et al. |
| 2007/0192478 A1 | 8/2007 | Louie et al. |
| 2007/0193397 A1 | 8/2007 | Hwan |
| 2007/0294368 A1 | 12/2007 | Bomgaars et al. |
| 2008/0075126 A1 | 3/2008 | Yang |
| 2009/0254843 A1 | 10/2009 | Van Wie et al. |
| 2010/0047757 A1 | 2/2010 | McCurry et al. |
| 2010/0199088 A1 | 8/2010 | Nath |

FOREIGN PATENT DOCUMENTS

| | | |
|---|---|---|
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 B1 | 6/2001 |
| EP | 1 107504 A2 | 6/2001 |
| EP | 1 130 492 A2 | 9/2001 |
| EP | 1 154 348 A2 | 11/2001 |
| EP | 1324565 A1 | 7/2003 |
| GB | 2 328 047 A | 2/1999 |
| JP | 2001-036517 | 2/2001 |
| JP | 2006-244044 A | 9/2006 |
| JP | 2009-020720 A | 1/2009 |
| WO | WO 96/41288 A1 | 12/1996 |
| WO | WO 00/56028 A2 | 9/2000 |
| WO | WO 01/61438 A2 | 8/2001 |
| WO | WO 01/63387 A2 | 8/2001 |
| WO | WO 01/63387 A3 | 8/2001 |
| WO | WO 01/77783 A2 | 10/2001 |
| WO | WO 01/78285 A1 | 10/2001 |
| WO | WO 01/84271 A2 | 11/2001 |

OTHER PUBLICATIONS

McDaniel et al. "Antigone: A Flexible Framework for Secure Group Communication," Proceedings of the 8th USENIX Security Symposium, Aug. 23, 1999.
Stallings, William, "Cryptography and Network Security: Principles and Practice," 1999, pp. 333-337, Second Edition, Prentice Hall, Upper Saddle River, New Jersey.
"Affect," The American Heritage Dictionary of the English Language, Fourth Edition, Houghton Mifflin Company, 2002. Retrieved May 4, 2006 from http://dictionary.reference.com/search?q=affect.
Microsoft Windows 200 server. Windows 2000 Group Policy White Paper, 2000.
Symantec. Norton Antivirus Corporate Edition Implementation Guide, 1999.
Crocker, Steven Toye, "Multi-level cryptographic transformations for securing digital assets," U.S. Appl. No. 10/404,566, filed Mar. 31, 2003.
Crocker, Steven Toye, "Effectuating access policy changes to designated places for secured files," U.S. Appl. No. 10/259,075, filed Sep. 27, 2002.
Kenrich, Michael Frederick, "Multi-Level File Digest", U.S. Appl. No. 10/894,493, filed Jul. 19, 2004.
Kinghorn, Gary Mark, "Method and system for protecting electronic data in enterprise environment," U.S. Appl. No. 10/159,220, filed May 31, 2002.
Nath, Satyajit, "Method and system for securing digital assets using content type designations," U.S. Appl. No. 10/405,587, filed Apr. 1, 2003.
Prakash, Nalini J., "Method and apparatus for securing/unsecuring files by file crawling," U.S. Appl. No. 10/325,102, filed Dec. 20, 2002.
Rossmann, Alain, "Hybrid systems for securing digital assets," U.S. Appl. No. 10/325,013, filed Dec. 20, 2002.
A Real-Time Push-Pull Communications Model for Distributed Real-Time and Multimedia Systems, Jan. 1999, School of Computer Sciences Carnegie Mellon University, Kanaka Juvva, Raj Rajkumar.
U.S. Appl. No. 10/889,685, entitled "Method and Apparatus for Controlling the Speed Ranges of a Machine" inventor Thomas, filed Jul. 13, 2004, 18 pgs.
U.S. Appl. No. 10/028,397, entitled "Method and system for restricting use of a clipboard application," inventor Zuili, filed Dec. 21, 2001, 38 pgs.
U.S. Appl. No. 10/368,277, entitled "Method and apparatus for uniquely identifying files," inventor Ouye, filed Feb. 18, 2003, 25 pgs.
U.S. Appl. No. 10/327,320, entitled "Security system with staging capabilities" inventor Vainstein, filed Dec. 20, 2002, 39 pgs.
U.S. Appl. No. 10/286,524, entitled "Security system that uses indirect password-based encryption," inventor Gutnik, filed Nov. 1, 2002, 38 pgs.
U.S. Appl. No. 10/242,185, entitled "Method and system for protecting encrypted files transmitted over a network" inventor Ryan, filed Sep. 11, 2002, 33 pgs.
U.S. Appl. No. 10/642,041, entitled "Method and system for fault-tolerant transfer of files across a network" inventor Kenrich, filed Aug. 15, 2003, 32 pgs.
U.S. Appl. No. 10/610,832, entitled "Method and system for enabling users of a group shared across multiple file security systems to access secured files" inventor Ryan, filed Jun. 30, 2003, 33 pgs.
U.S. Appl. No. 10/074,194, entitled "Methods for idnetifying compunds that inhibit or reduce PTP1B expressions" inventor Rondinone, filed Feb. 12, 2002, 69 pgs.
U.S. Appl. No. 10/074,804, entitled "Secured Data Format for Access Control," inventor Garcia, filed Feb. 12, 2002, 108 pgs.
U.S. Appl. No. 10/075,194, entitled "System and Method for Providing Multi-location Access Management to Secured Items," inventor Vainstein et al., filed Feb. 12, 2002, 110 pgs.
U.S. Appl. No. 10/074,996, entitled "Method and Apparatus for Securing Electronic Data," inventor Lee et al., filed Feb. 12, 2002, 111 pgs.
U.S. Appl. No. 10/074,825, entitled "Method and Apparatus for Accessing Secured Electronic Data Off-line," inventor Lee et al., filed Feb. 12, 2002, 108 pgs.
U.S. Appl. No. 10/105,532, entitled "System and Method for Providing Different Levels of Key Security for Controlling Access to Secured Items," inventor Hildebrand et al., filed Mar. 20, 2002, 86 pgs.
U.S. Appl. No. 10/186,203, entitled "Method and System for Implementing Changes to Security Policies in a Distributed Security System," inventor Huang, filed Jun. 26, 2002, 65 pgs.
U.S. Appl. No. 10/201,756, entitled "Managing Secured Files in Designated Locations," inventor Alain, filed Jul. 22, 2002, 121 pgs.
U.S. Appl. No. 10/206,737, entitled "Method and System for Updating Keys in a Distributed Security System," inventor Hildebrand, filed Jul. 26, 2002, 60 pgs.
U.S. Appl. No. 10/246,079, entitled "Security System for Generating Keys from Access rules in a Decentralized Manner and Methods Therefor," inventor Hildebrand, filed Sep. 17, 2002, 78 pgs.
U.S. Appl. No. 10/259,075, entitled "Effectuating Access Policy Changes to Designated Places for Secured Files," inventor Crocker, filed Sep. 27, 2002, 60 pgs.
U.S. Appl. No. 10/286,575, entitled "Method and Architecture for Providing Access to Secured Data from Non-Secured Clients," inventor Vainstein, filed Nov. 1, 2002, 46 pgs.
U.S. Appl. No. 10/295,363, entitled "Security System Using Indirect Key Generation from Access Rules and Methods Therefor," inventor Vainstein, filed Nov. 15, 2002, 70 pgs.
U.S. Appl. No. 11/889,310, entitled "Methods and Systems for Providing Access Control to Electronic Data," inventor Rossmann, filed Aug. 10, 2007, 90 pgs.
U.S. Appl. No. 11/797,367, entitled "Method and System for Managing Security Tiers," inventor Vainstein, filed May 2, 2007, 11 pgs.

(56) References Cited

OTHER PUBLICATIONS

Adobe Acrobat 5.0 Classroom in a Book, Adobe Press, Jun. 26, 2001, pp. 1-4.
Adobe Acrobat Security Settings, Acrobat 7.0, Nov. 15, 2004, pp. 1-4.
"Security Options". Dec. 20, 2001. DC & Co. pp. 1-2.
Microsoft Press Computer Dictionary, 1997, Microsoft Press, Third Edition, p. 426.
Search Report, completion date May 8, 2003, for European Patent Application No. EP 02 25 8530, 2 pages.
Search Report, completion date Oct. 2, 2003, for European Patent Application No. EP 02 25 8531, 2 pages.
Search Report, completion date Apr. 14, 2005, for European Patent Application No. EP 02 25 8533, 2 pages.
Search Report, completion date Mar. 16, 2005, for European Patent Application No. EP 02 25 8534, 2 pages.
Search Report, completion date Mar. 2, 2005, for European Patent Application No. EP 02 25 8535, 2 pages.
Search Report, completion date Mar. 3, 2005, for European Patent Application No. EP 02 25 8537, 2 pages.
Search Report, completion date May 12, 2005, for European Patent Application No. EP 02 25 8539, 2 pages.
Search Report, completion date Jul. 6, 2005, for European Patent Application No. EP 02 25 8529, 4 pages.
Search Report, completion date Oct. 8, 2003, for European Patent Application No. EP 02 25 8536, 2 pages.
Search Report, completion date May 8, 2003, for European Patent Application No. EP 02 25 8540, 2 pages.
Examination Report, completion date Jun. 18, 2008, for European Patent Application No. EP 02 258 532.7-1244, 6 pgs.
Boneh et al., "Hierarchical Identity Based Encryption with Constant Size Ciphertext," Advances in Cryptology—EUROCRYPT 2005, vol. 3493, Jun. 20, 2005, pp. 440-456.
Boneh et al., "IBE Secure E-mail," Stanford University, Apr. 8, 2002, http://crypto.stanford.edu/ibe/.
"Inside Encrypting file system," Part 1, from MSDN Oct. 2001 version, exact publication date is unknown but believed prior to Dec. 12, 2001.
"Inside Encrypting file system," Part 2, from MSDN Oct. 2001 version, exact publication date is unknown but believed prior to Dec. 12, 2001.
"Security with Encrypting File System," from MSDN Oct. 2001 version, exact publication date is unknown but believed prior to Dec. 12, 2001.
"How EFS works," from MSDN Oct. 2001 version, exact publication date is unknown but believed prior to Dec. 12, 2001.
"Encrypting File System," from MSDN Oct. 2001 version, exact publication date is unknown but believed prior to Dec. 12, 2001.
"Features of EFS" from MSDN Oct. 2001 version, exact publication date is unknown but believed prior to Dec. 12, 2001.
"Windows 2000 EFS" in the Apr. 1999 issue of Windows NT magazine.
Curtis et al., "Securing the Global, Remote, Mobile User," 1999 John Wiley & Sons, Ltd., Int. J. Network Mgmt. 9, pp. 9-21.
"Secure Sockets Layer (SSL): How it Works," Verisign, http://www.verisign.com/ssl/ssl-information-center/how-ssl-security-works, pp. 1-2.
"Column Archives," Microsoft TechNet, Professor Windows, technet.microsoft.com/enus/library/bb878075.aspx, retrieved on Dec. 3, 2009.
"Columns," Microsoft TechNet http://web.archive.org/web/20021014225142/www.microsoft.com/techneUcolumns/default.asp Oct. 14, 2002, Retrieved from web.archive.org on Dec. 3, 2009.
"eXPeriencing Remote Assistance" Microsoft TechNet—Professor Windows Oct. 15, 2002 http://web.archive.org/web/20021015165237/www.microsoft.com/techneUcolumns/profwin/, Retrieved from web.archive.org on Dec. 3, 2009.
"Migrating Accounts From Windows NT 4.0 Domains to Windows 2000," Microsoft TechNet—Professor Windows Apr. 2002, http://web.archive.org/web/20020415004611/www. microsoft.com/techneticolu mns/profwin/, Apr. 15, 2002.
"Scripting Your Windows 2000 Network, Part 1" Microsoft TechNet—Professor Windows Jun. 2002, http://web.archive.org/web/20020622055532/www.microsoft.com/techneUcolumns/profwin/ Retrieved from web.archive.org on Dec. 3, 2009.
"WayBack Machine" web.archive.org, http://web.archive.org/web/*/http://www.microsoft.com/technetlcolumns/profwin/, Retrieved on Dec. 3, 2009.
English language translation (unverified, machine-generated) of Japanese Patent Publication No. JP 2006-244044, Japanese Patent Office, Patent & Utility Model Gazette DB, 2006.
English language translation (unverified, machine-generated) of Japanese Patent Publication No. 2009-020720, Japanese Patent Office, Patent & Utility Model Gazette DB, 2009.
Office Action, dated Oct. 5, 2005, for European Patent Application No. 02258532.7, 5 pgs.
Office Action, dated Dec. 5, 2006, for European Patent Application No. 02258532.7, 5 pgs.
English language abstract for Japanese Appl. No. 2001-036517, filed Feb. 9, 2001, 1 pg.
Botha et al., "Access Control in Document-Centric Workflow Systems—An Agent-Based Approach," Computers & Security, vol. 20:6, Sep. 2001, pp. 525-532.
Botha et al., "Separation of Duties for Access Control Enforcement in Workflow Environments," IBM, 2001.
Non-Final Office Action dated Jun. 28, 2006, issued in U.S. Appl. No. 10/074,804, filed Feb. 12, 2002, 15 pgs.
Non-Final Office Action dated Jul. 21, 2005, issued in U.S. Appl. No. 10/074,804, filed Feb. 12, 2002, 12 pgs.
Final Office Action dated Nov. 29, 2005, issued in U.S. Appl. No. 10/074,804, filed Feb. 12, 2002, 14 pgs.
Non-Final Office Action dated Nov. 10, 2008, issued in U.S. Appl. No. 10/075,194, filed Feb. 12, 2002, 18 pgs.
Final Office Action dated Oct. 25, 2006, issued in U.S. Appl. No. 10/074,804, filed Feb. 12, 2002, 15 pgs.
Non-Final Office Action dated Aug. 10, 2007, issued in U.S. Appl. No. 10/075,194, filed Feb. 12, 2002, 23 pgs.
Final Office Action dated May 13, 2009, issued in U.S. Appl. No. 10/075,194, filed Feb. 12, 2002, 22 pgs.
Final Office Action dated Apr. 28, 2008, issued in U.S. Appl. No. 10/075,194, filed Feb. 12, 2002, 23 pgs.
Final Office Action dated Jul. 14, 2006, issued in U.S. Appl. No. 10/075,194, filed Feb. 12, 2002, 25 pgs.
Non-Final Office Action dated Jul. 21, 2005, issued in U.S. Appl. No. 10/405,587, filed Apr. 1, 2003, 11 pgs.
Non-Final Office Action dated Jun. 23, 2009, issued in U.S. Appl. No. 10/286,524, filed Nov. 1, 2002, 20 pgs.
Non-Final Office Action dated Jan. 12, 2009, issued in U.S. Appl. No. 10/286,524, filed Nov. 1, 2002, 28 pgs.
Non-Final Office Action dated Jan. 22, 2008, issued in U.S. Appl. No. 10/286,524, filed Nov. 1, 2002, 17 pgs.
Non-Final Office Action dated Dec. 8, 2006, issued in U.S. Appl. No. 10/286,524, filed Nov. 1, 2002, 19 pgs.
Non-Final Office Action dated Jun. 23, 2006, issued in U.S. Appl. No. 10/286,524, filed Nov. 1, 2002, 14 pgs.
Final Office Action dated Jul. 8, 2008, issued in U.S. Appl. No. 10/286,524, filed Nov. 1, 2002, 17 pgs.
Final Office Action dated Aug. 22, 2007, issued in U.S. Appl. No. 10/286,524, filed Nov. 1, 2002, 17 pgs.
Non-Final Office Action dated Jun. 14, 2006, issued in U.S. Appl. No. 10/295,363, filed Nov. 15, 2002, 42 pgs.
Non-Final Office Action dated Jun. 18, 2007, issued in U.S. Appl. No. 10/295,363, filed Nov. 15, 2002, 42 pgs.
Non-Final Office Action dated Jun. 11, 2008, issued in U.S. Appl. No. 10/295,363, filed Nov. 15, 2002, 39 pgs.
Non-Final Office Action dated May 11, 2009, issued in U.S. Appl. No. 10/295,363, filed Nov. 15, 2002, 44 pgs.
Final Office Action dated Dec. 1, 2006, issued in U.S. Appl. No. 10/295,363, filed Nov. 15, 2002, 51 pgs.
Final Office Action dated Nov. 27, 2007, issued in U.S. Appl. No. 10/295,363, filed Nov. 15, 2002, 51 pgs.
Final Office Action dated Dec. 9, 2008, issued in U.S. Appl. No. 10/295,363, filed Nov. 15, 2002, 44 pgs.

* cited by examiner

METHOD AND SYSTEM FOR USING REMOTE HEADERS TO SECURE ELECTRONIC FILES

CROSS-REFERENCE TO RELATED APPLICATIONS

This application is related to (i) U.S. patent application Ser. No. 10/405,587, filed Apr. 1, 2003, and entitled "METHOD AND SYSTEM FOR SECURING DIGITAL ASSETS USING CONTENT TYPE DESIGNATIONS," which is hereby incorporated herein by reference; (ii) U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated herein by reference; (iii) U.S. patent application Ser. No. 10/285,524, filed Nov. 1, 2002, and entitled "SECURITY SYSTEM THAT USES INDIRECT PASSWORD-BASED ENCRYPTION," which is hereby incorporated herein by reference; and (iv) U.S. patent application Ser. No. 10/295,363, filed Nov. 15, 2002, and entitled "SECURITY SYSTEM USING INDIRECT KEY GENERATION FROM ACCESS RULES AND METHODS THEREFOR," which is hereby incorporated herein by reference.

BACKGROUND OF THE INVENTION

1. Field of the Invention

The present invention relates to security systems for data and, more particularly, to security systems that protect data in an inter/intra enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is an open, public and international network of interconnected computers and electronic devices. Without proper security means, an unauthorized person or machine may intercept information traveling across the Internet and even gain access to proprietary information stored in computers that connect to the Internet.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day hundreds of thousands of people interact electronically, whether it is through e-mail, e-commerce (business conducted over the Internet), ATM machines, or cellular phones. The perpetual increase of information transmitted electronically has led to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an unsecure communication channel without disclosing the contents of the information to anyone eavesdropping on the communication channel. Using an encryption process in a cryptographic technique, one party can protect the contents of the data in transit from access by an unauthorized third party, yet the intended party can read the data using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of the Internet, contractual information, customer data, executive communications, product specifications, and a host of other confidential and proprietary intellectual property remain available and vulnerable to improper access and usage by unauthorized users within or outside a supposedly protected perimeter.

Many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary information residing on private networks. For example, depending on passwords to access sensitive files (documents) from within often causes security breaches when the password of a few characters long is leaked or detected. Consequently, various cryptographic means are deployed to provide restricted access to electronic data in security systems.

Various security criteria, such as access rules and encryption or decryption keys, are often used to secure and thus restrict access to files in security systems. The security criteria often forms part of (e.g., embedded within) the secured files. However, once files have been secured, it is difficult to alter the security criteria applicable to such secured files. Hence, if the security criteria needs to be changed, the secured files have to first be unsecured and then re-secured using the updated security criteria. Such processing can be very burdensome to a security system, particularly when a large number of files are managed by the system and/or when copies of secured files are distributed over a network to various locations.

Therefore, there is a need to provide more effective ways to subsequently alter security criteria used by security systems to secure and protect electronic files.

SUMMARY OF THE INVENTION

Broadly speaking, the invention relates to a file security system that serves to manage secured files (documents). The file security system provides centralized management and storage of security information that can be referenced by secured files. In other words, a secured file need not itself contain security information that is needed to determine whether access to the secured file is to be permitted. That is, at least a portion of the security information can be remotely stored and accessed by way of an identifier that is provided within the secured file. By centralizing storage of security information, the file security system is able to subsequently modify access criteria for secured files (documents) without having to physically make modifications to the secured files.

The invention can be implemented in numerous ways, including as a method, system, device, and computer readable medium. Several embodiments of the invention are discussed below.

As a method for restricting access to electronic files, one embodiment of the invention includes at least the acts of: identifying a file to be secured; determining an appropriate remote header identifier for the file being secured, the remote header identifier specifies a remote header that is maintained at a remote server; obtaining a file key specifically for use in securing the file; encrypting data of the file being secured using the file key; encrypting the file key; and forming a secured file, the secured file including at least the remote header identifier, the encrypted file key and the encrypted data.

As a method for accessing a secured electronic file, one embodiment of the invention includes at least the acts of: identifying a secured electronic file to be accessed, the secured electronic file having a header portion and a data portion, the header portion storing a remote header identifier and an encrypted file key, and the data portion storing encrypted data; obtaining the remote header identifier from the header portion of the secured electronic file; receiving, from a remote server, a remote header that corresponds to the remote header identifier; obtaining the encrypted file key from the secured electronic file; decrypting the encrypted file key to obtain a file key; and decrypting the encrypted data within the data portion of the secured electronic file using the file key.

As a method for restricting access to electronic documents, one embodiment of the invention includes at least the acts of: identifying a document to be secured; determining a category for the document; retrieving a remote header identifier associated with the category for the document; generating a file key for the document; encrypting a data portion of the document using the file key to obtain encrypted data; encrypting the file key using a public key associated with the remote header identifier to obtain an encrypted file key; and producing a secured version of the document including the remote header identifier, the encrypted file key and the encrypted data.

As a computer readable medium including at least computer program code for restricting access to electronic files, one embodiment of the invention includes at least: computer program code for identifying a file to be secured; computer program code for determining an appropriate remote header identifier for the file being secured, the remote header identifier specifies a remote header that is maintained at a remote server; computer program code for obtaining a file key specifically for use in securing the file; computer program code for encrypting data of the file being secured using the file key; computer program code for encrypting the file key; and computer program code for forming a secured file, the secured file including at least the remote header identifier, the encrypted file key and the encrypted data.

As a computer readable medium including at least computer program code for accessing a secured electronic file, one embodiment of the invention includes at least: computer program code for identifying a secured electronic file to be accessed, the secured electronic file having a header portion and a data portion, the header portion storing a remote header identifier and an encrypted file key, and the data portion storing encrypted data; computer program code for obtaining the remote header identifier from the header portion of the secured electronic file; computer program code for receiving, from a remote server, a remote header that corresponds to the remote header identifier; computer program code for obtaining the encrypted file key from the secured electronic file; computer program code for decrypting the encrypted file key to obtain a file key; and computer program code for decrypting the encrypted data within the data portion of the secured electronic file using the file key.

As a file security system, one embodiment of the invention includes at least a header manager and a header database. The header manager restricts access to headers for electronic files protected by the file security system. The header database stores a plurality of different headers that are identified by header identifiers. In unsecuring a previously secured file, the file security system retrieves a particular header from the header database via the header manager, the particular header being retrieved being dependent on a particular header identifier provided in a secured file. The file security system evaluates whether to permit a requestor to access the secured file based on information contained in the particular header that is identified by the particular header identifier.

Other aspects and advantages of the invention will become apparent from the following detailed description, taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
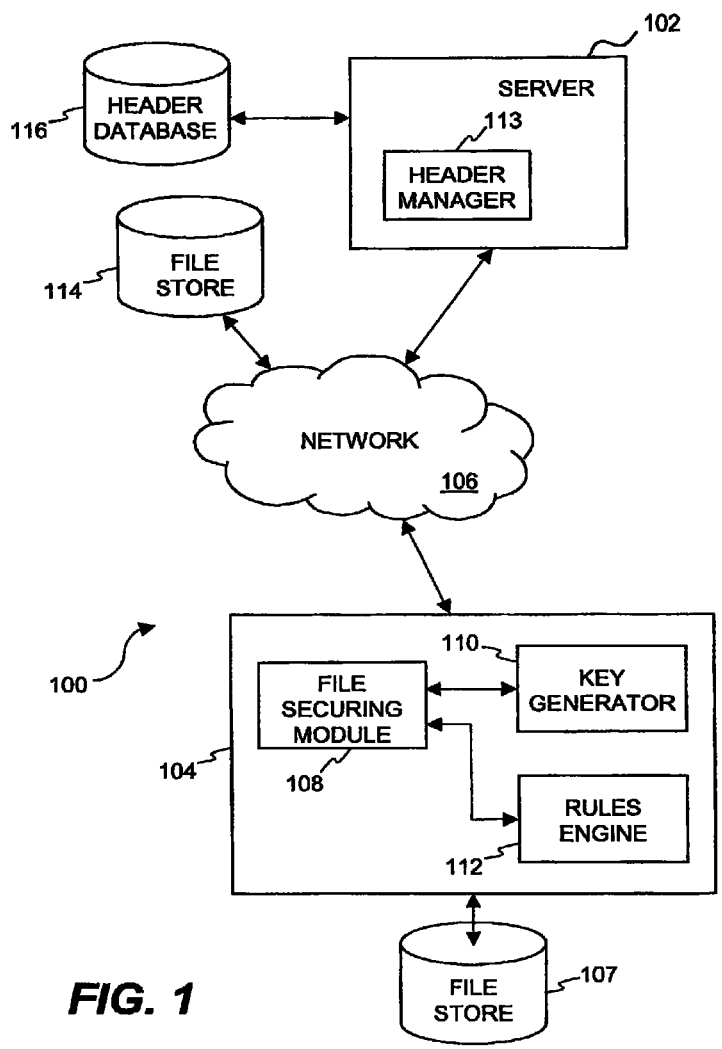
FIG. 1 is a block diagram of a file security system according to one embodiment of the invention.

The invention relates to a file security system that serves to manage secured files (documents). The file security system provides centralized storage and management of security information that can be referenced by secured files. In other words, a secured file need not itself contain security information that is necessary to determine whether access to the secured file is to be permitted. That is, at least a portion of the security information can be remotely stored and accessed by way of an identifier that is provided within the secured file. By centralizing storage of security information, the file security system is able to subsequently modify access criteria for secured files (documents) without having to physically make modifications to the secured files.

The present invention is related to processes, systems, architectures and software products for providing pervasive security to digital assets (e.g., electronic files). The present invention is particularly suitable in an enterprise environment. In general, pervasive security means that digital assets (e.g., files) are secured (i.e., secured items) and can only be accessed by authenticated users with appropriate access rights or privileges.

Secured files are files that require one or more keys, passwords, access privileges, etc. to gain access to their content. The security is often provided through encryption and access rules. The files, for example, can pertain to documents, multimedia files, data, executable code, images and text. In general, a secured file can only be accessed by authenticated users with appropriate access rights or privileges.

In one embodiment, each secured file is provided with a header portion and a data portion, where the header portion contains, or points to, security information. The security information is used to determine whether access to associated data portions of secured files is permitted.

In one embodiment, security information associated with a secured file controls restrictive access to a data portion which is encrypted. The security information can employ access rules together with cipher keys (e.g., a file key, a content type key and/or various other keys) to ensure that only those users with proper access privileges or rights can access the encrypted data portion.

As used herein, a user may mean a human user, a software agent, a group of users, a member of the group, a device and/or application. Besides a human user who needs to access a secured document, a software application or agent sometimes needs to access secured files in order to proceed. Accordingly, unless specifically stated, the "user" as used herein does not necessarily pertain to a human being. The distribution of such changes to security policies can be deferred for those affected users who are not activated (e.g., logged-in or on-line) with the security system.

In the following description, numerous specific details are set forth in order to provide a thorough understanding of the present invention. However, it will become obvious to those skilled in the art that the present invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed herein with reference to FIGS. 1-8. However, those skilled in the art will readily appreciate that the detailed description given herein with respect to these figures is for explanatory purposes as the invention extends beyond these limited embodiments.

FIG. 1 is a block diagram of a file security system 100 according to one embodiment of the invention. The file security system 100 includes a server 102 that controls access to various electronic files. A client machine 104 interacts with the server 102 through a network 106 in order to obtain access to the electronic files that are secured. In one embodiment, the electronic files are electronic documents.

The client machine 104 is a computing device. As an example, the computing device can be a personal computer, a personal digital assistant, etc. The network 106 is, for example, a computer network, such as a global computer network, a wide area network, or a local area network.

The client machine 104 includes a file securing module 108, a key generator 110 and a rules engine 112. The file securing module 108 not only operates to secure electronic files through use of encryption and rules (i.e., access rules), but also can operate to evaluate whether a requestor is entitled to access previously secured electronic files. The key generator 110 produces keys (encryption keys) that are used to encrypt or decrypt the electronic files. The rules engine 112 is utilized to evaluate whether the rules associated with a particular electronic file to be accessed are satisfied by the requestor.

The server 102 can restrict access by a requestor to electronic files stored in a file store 107 or 114. In this regard, the server 102 can operate to evaluate whether the requestor is entitled to access previously secured electronic files stored in the file store 107 or 114. The server 102 also includes a header manager 113. The header manager 113 controls access to the header database 116. The header database 116 stores remote headers that are used to contain security information associated with the secured electronic files. In other words, security information provided in a remote header is able to be centrally stored in the header database 116. As a result, when secured electronic files are to be accessed at the client machine 104, the client machine 104 (if authorized) can retrieve the corresponding header information from the header database 116 via the server 102. The client machine 104 can then evaluate the security information to determine whether the requestor at the client machine 104 is entitled to access particular electronic files.

When an administrator seeks to change one or more headers stored within the header database 116, the header manager 113 determines whether the administrator is authenticated and permitted to make the change. If authenticated and permitted, the administrator is able to change one or more headers within the header database 116. One advantage of the invention is that an administrator of the file security system 100 can subsequently alter the security information associated with electronic files (documents) that have already been secured and distributed to one or more client machines. In this regard, an administrator can interact with the server 102 to provide a replacement remote header in the header database 116 which is linked to the electronic file. The replacement header can represent a new remote header or an altered remote header.

In embodiments of the file security system 100 that utilize rules associated with groups of users, security levels and/or content types, the administrator can alter the one or more groups that are entitled to access a particular secured electronic document by altering its associated remote header. Similarly, if the security information in the original header pertains to content type restrictions, then a replacement remote header can be substituted therefor to alter the content type associated with the secured electronic document. In these examples, the associated remote header is able to be changed without having to alter the secured document. Consequently, the specifics of the security provided to a secured file can be changed without directly altering the secured file.

Figure 2A:
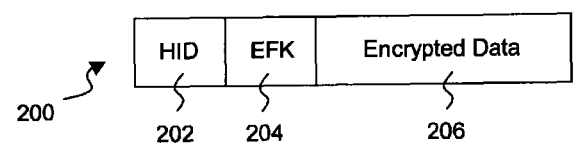
FIG. 2A is a diagram of a representative format for a secured file.

FIG. 2A is a diagram of a representative format 200 for a secured file according to one embodiment of the invention. The representative format 200 includes a header identifier (HID) 202, an encrypted file key (EFK) 204 and encrypted data 206. The header identifier 202 is a pointer or link to a remote header that is stored on a remote server, such as the server 102 or a device coupled thereto. The encrypted file key 204 is an encrypted version of a file key that is needed to decrypt the encrypted data 206 of the secured file. Additionally, the header identifier 202 and the encrypted file key 204 can be referred to as a header portion of the representative format 200, and the encrypted data 206 can be referred to as a data portion of the representative format 200. The header portion might include one or more flags, user identifiers, etc.

Further, it should be noted that since the header identifier 202 is a pointer or link, the size of the header identifier 202 is substantially smaller than the size of the security information that is stored in the remote header pointed to by the header identifier 202. In other words, the representative format 200 results in a smaller secured file through use of the remote header.

Figure 2B:
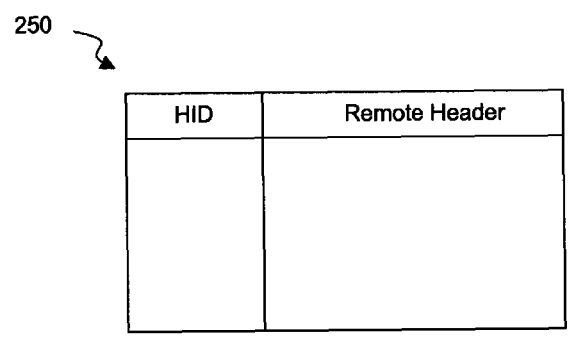
FIG. 2B illustrates an exemplary database table that could be provided within a header database according to one embodiment of the invention.

The remote header stored in the header database 116 illustrated in FIG. 1 can be coupled to or part of the server 102. The format in which the header database 116 stores the remote headers can vary depending upon implementation. FIG. 2B illustrates an exemplary database table 250 that could be provided within the header database 116 according to one embodiment of the invention. The exemplary database table 250 serves to associate a header identifier (HID) to a remote header. In other words, the header identifier is used as an index to the appropriate one of the remote headers stored in the header database 116. The remote header can include security information for the associated electronic file. For example, the security information can include access rules, key blocks and perhaps other information.

Figure 3:
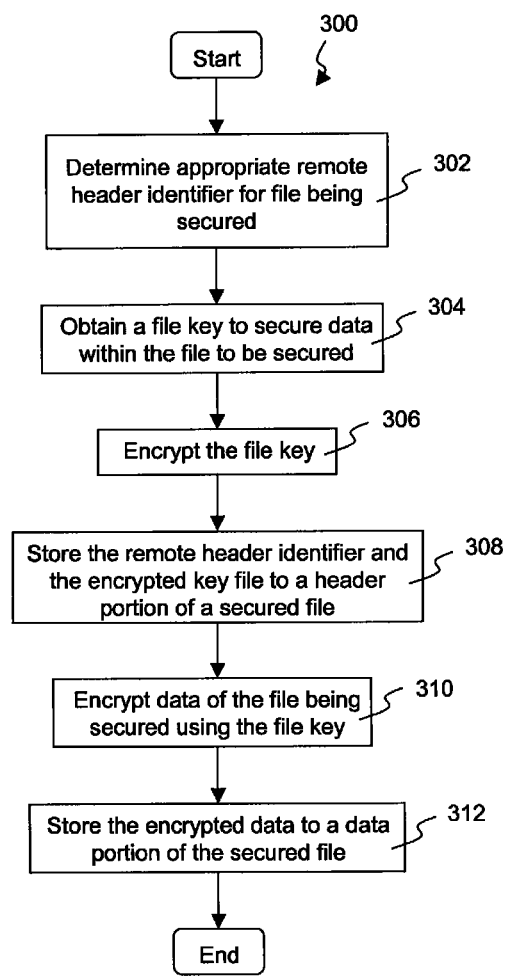
FIG. 3 is a flow diagram of a file securing process according to one embodiment of the invention.

FIG. 3 is a flow diagram of a file securing process 300 according to one embodiment of the invention. The file securing process 300 is, for example, performed by the server 102 illustrated in FIG. 1.

The file securing process 300 is initiated once an electronic file to be secured has been identified. Once an electronic file to be secured has been identified, an appropriate remote header identifier is determined 302 for the electronic file. Then, a file key that is used to secure data within the electronic file is obtained 304. For example, in the case where the server 102 is performing the file securing process 300, the key generator 110 illustrated in FIG. 1 can be used to generate the file key.

Thereafter, the file key is encrypted 306. The encryption of the file key can use one or more levels of encryption. In one implementation, a public key for remote header is used to encrypt the file key. The remote header identifier and the encrypted file key are then stored 308 to a header portion of a secured file. The corresponding remote header identified by the remote header identifier includes a private key for remote header that is encrypted by one or more public keys of groups (or user). The secured file represents the secured version of the electronic file being secured. In other words, the file securing process 300 converts an electronic file to be secured into a secured file. After the processing has been performed to secure the electronic file, the system retains only the secured file.

Next, the data of the electronic file being secured is encrypted 310 using the file key. Thereafter, the encrypted data is stored 312 to a data portion of the secured file. Following the operation 312, the file securing process 300 is complete and ends.

At this point, a secured file has been created, and the secured file contains a reference to a remote header. For example, in one embodiment, the reference is a remote header identifier. A file key used to encrypt the data portion of the secured file which is itself secured by one or more layers of encryption. However, since the ability to decrypt the file key is dependent upon security information provided in the remote header, the access control to the secured file can be altered or adjusted by changing the security information provided in the associated remote header. Consequently, by altering the remote header pointed or linked to by the remote header identifier of the secured file, an administrator can change the security information, and thus the access control, to the file key that is needed to decrypt the secured data provided within the secured file.

Figure 4:
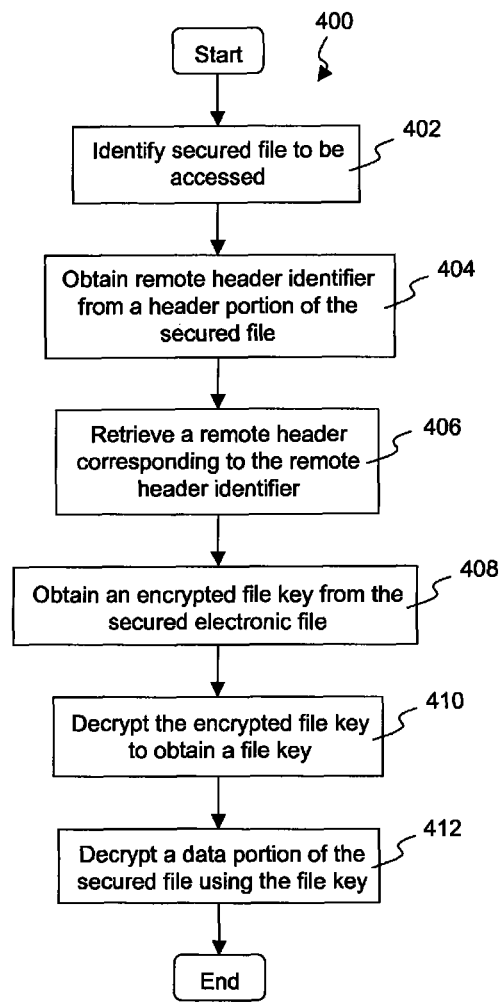
FIG. 4 is a flow diagram of a file unsecuring process according to one embodiment of the invention.

FIG. 4 is a flow diagram of a file unsecuring process 400 according to one embodiment of the invention. The file unsecuring process 400 can be performed at a client machine, such as the client machine 104 illustrated in FIG. 1, or a server, such as the server 102 illustrated in FIG. 1.

The file unsecuring process 400 initially identifies 402 a secured file to be accessed. Then, a remote header identifier is obtained 404 from a header portion of the secured file. For example, as shown in FIG. 2A, the format for the secured file can include a remote header identifier that points to a remote header that contains security information that is needed to unsecure the secured file.

Next, a remote header corresponding to the remote header identifier is retrieved 406. Typically, the remote header resides in a central storage location, such as the server 102 or the header database 116 illustrated in FIG. 1. The remote header can then be provided to the device (e.g., client machine or server) performing the file unsecuring process 400. For example, the remote header might be provided to the client machine 104 or the server 102 illustrated in FIG. 1.

An encrypted file key is obtained 408 from the secured electronic file. For example, as shown in FIG. 2A, the format for the secured file can include an encrypted file key. The encrypted file key can then be decrypted 410 to obtain a file key. Typically, in order to decrypt 410 the encrypted file key, the security information within the remote header would need to be accessed. Such security information is typically protected by one or more levels of encryption. For example, the requestor might be required to be a member of a group, so that the requestor has access to a group key that is needed to decrypt the encrypted file key.

In any case, after the encrypted file key is decrypted 410, a data portion of the secured file is then decrypted 412 using the file key. At this point, the data of the secured file has been unsecured (i.e., is in the "clear") and thus able to be utilized by the requestor. Following the operation 412, the file unsecuring process 400 is complete and ends.

Figure 5:
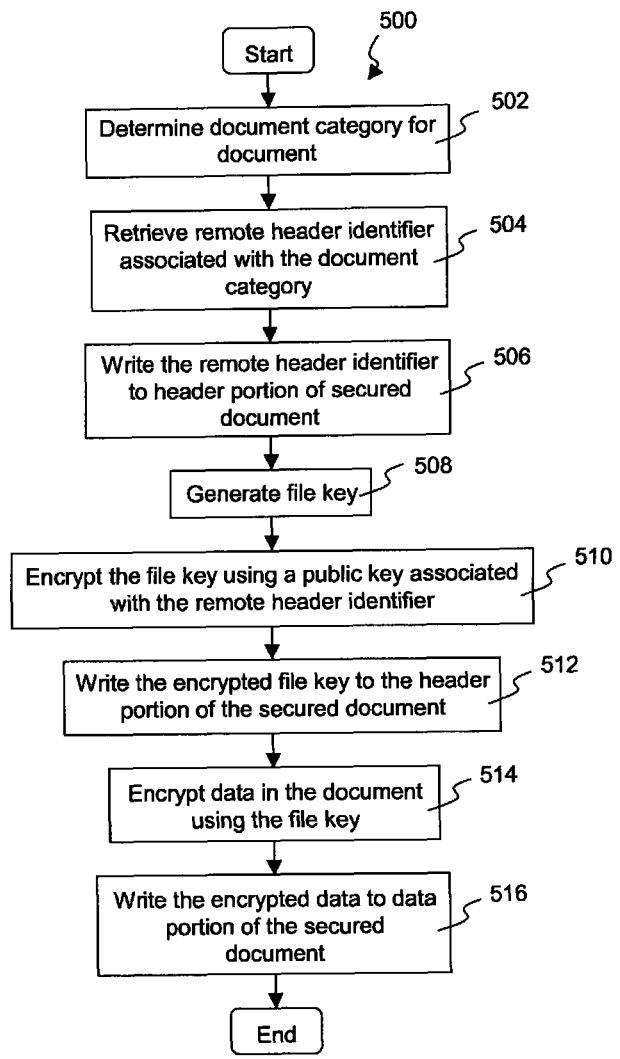
FIG. 5 is a flow diagram of a document encryption process according to one embodiment of the invention.

FIG. 5 is a flow diagram of a document encryption process 500 according to one embodiment of the invention. The document encryption process 500 is, for example, performed at a client machine or a server machine, such as the client machine 104 or the server 102 illustrated in FIG. 1.

The document encryption process 500 initially determines 502 a document category for the document to be encrypted (secured). Next, a remote header identifier associated with the document category is retrieved 504. In this embodiment, each document category has associated therewith a remote header identifier. In other words, documents of the same document category can share a common remote header identifier.

After the remote header identifier is retrieved 504, the remote header identifier can then be written 506 to a header portion of a secured document being formed. A file key is generated 508. The file key is, for example, a symmetric key. Next, the file key is encrypted 510 using a public key associated with the remote header identifier. For example, the remote header identifier points to a remote header that contains security information. The security information can include a public key that is utilized to encrypt the file key. The security information would typically also include a private key, usually also encrypted, so that the file key is able to be subsequently decrypted.

Next, the encrypted file key is written 512 to the header portion of the secured document. Additionally, data in the document being secured is encrypted 514 using the file key. The encrypted data is then written 516 to a data portion of the secured document. Following the operation 514, the document encryption process 500 is complete and ends.

Figure 6A:
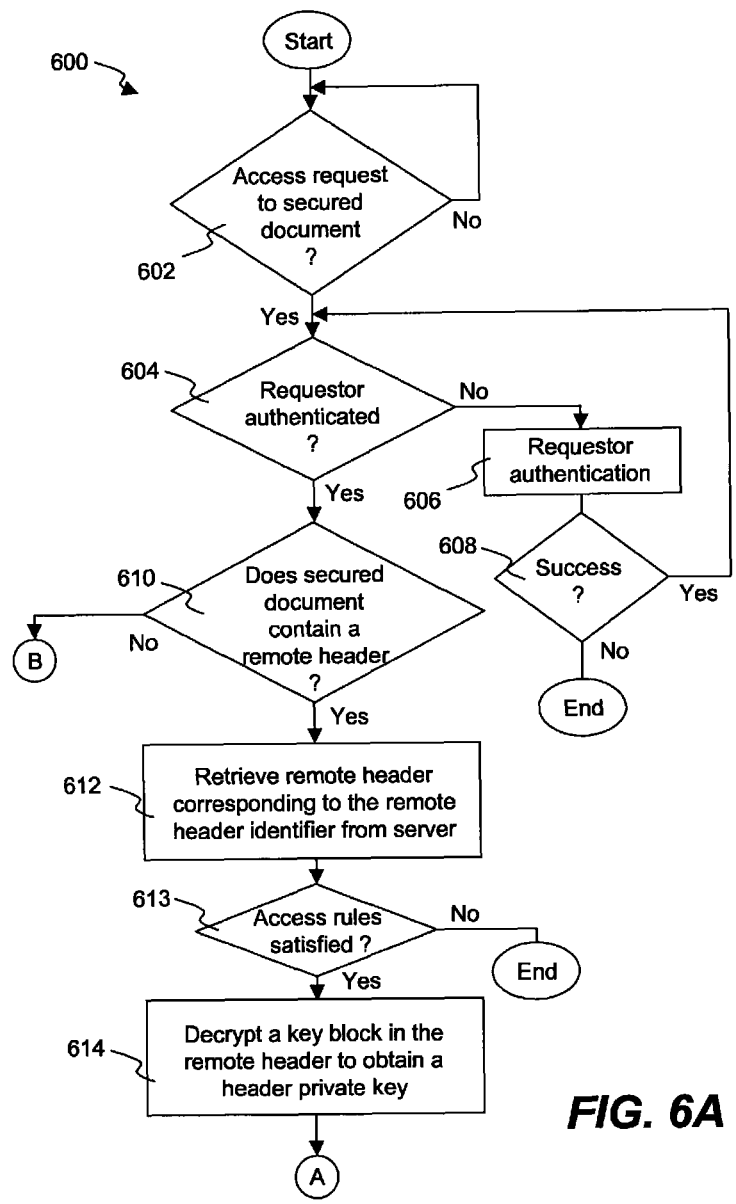
FIGS. 6A-6C are flow diagrams of a document access process according to one embodiment of the invention.
Figure 6B:
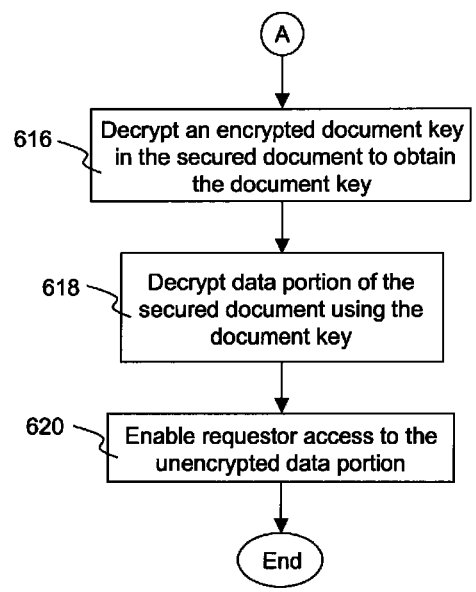
Figure 6C:
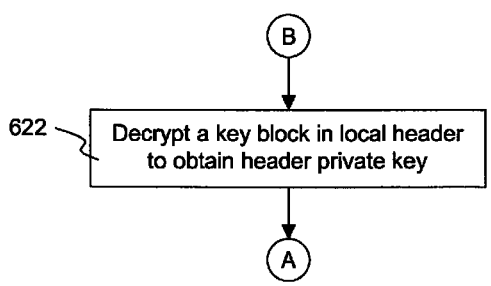

FIGS. 6A-6C are flow diagrams of a document access process 600 according to one embodiment of the invention. The document access process 600 can be performed at a client machine, such as the client machine 104 illustrated in FIG. 1, or a server, such as the server 102 illustrated in FIG. 1.

The document access process 600 begins with a decision 602 that determines whether an access request to a secured document is being made. When the decision 602 determines that an access request to a secured document is not being made, then the document access processing 600 awaits such a request. Once the decision 602 determines that an access request to a secured document has been received, then a decision 604 determines whether the requestor is authenticated with the system. When the decision 604 determines that the requestor is not authenticated, then requestor authentication 606 is performed. The requestor authentication 606 can require the requestor login to a system, for example, by providing a user name and password. A decision 608 then determines whether the authentication has been successful. When the decision 608 determines that authentication has not been successful, then the document access process 600 is complete and ends because the requestor is not recognized by the system. On the other hand, when the decision 608 determines that authentication has been successful, then the document access process 600 returns to repeat the decision 604 and subsequent operations.

In any case, once the decision 604 determines that the requestor has been authenticated, then a decision 610 determines whether the secured document contains a remote header. In one implementation, the decision 610 can determine whether the secured document contains a remote header based on the presence of a remote header identifier or some other indicator within the secured document. Here, the system can presumably process secured documents that utilize a remote header as well as secured documents that utilize a local header. When the decision 610 determines that the secured document contains a remote header, the remote header is retrieved 612 from a remote server. The particular remote header being retrieved 612 is the remote header that corresponds to the remote header identifier provided within the secured document. For example, the remote server can be the server 102 illustrated in FIG. 1. The remote header can include access rules and one or more key blocks, each key block being associated with different groups.

Next, a decision 613 determines whether the access rules are satisfied by the requestor. The access rules being evaluated are those within the remote header and perhaps other rules within the secured document. If the access rules are not satisfied, then the document access process 600 is complete and ends. On the other hand, of the access rules are satisfied, then a key block in the remote header is decrypted 614 to obtain a header private key. Here, the requestor can retrieve the key block that the requestor is associated with the key block, unlock the key block, and obtain a header private key. Next, an encrypted document (doc) key in the secured document is decrypted 616 to obtain a document (doc) key. Here, the header private key can be used to decrypt the encrypted document key to obtain the document key.

Thereafter, a data portion of the secured document is decrypted 618 using the document key. Thereafter, the requestor is enabled 620 to access the unencrypted data portion of the previously secured document. Following the operation 620, the document access process 600 is complete and ends in the case in which the secured document utilized a remote header.

On the other hand, when the decision 610 determines that the secured document does not utilize a remote header, other processing is performed. Specifically, when the decision 610 determines that the secured document does not contain a remote header, then a key block from the local header is decrypted 622 to obtain a header private key. Thereafter, the operations 616-620 are performed to provide the requestor with access to the unencrypted data portion of the secured document.

Figure 7:
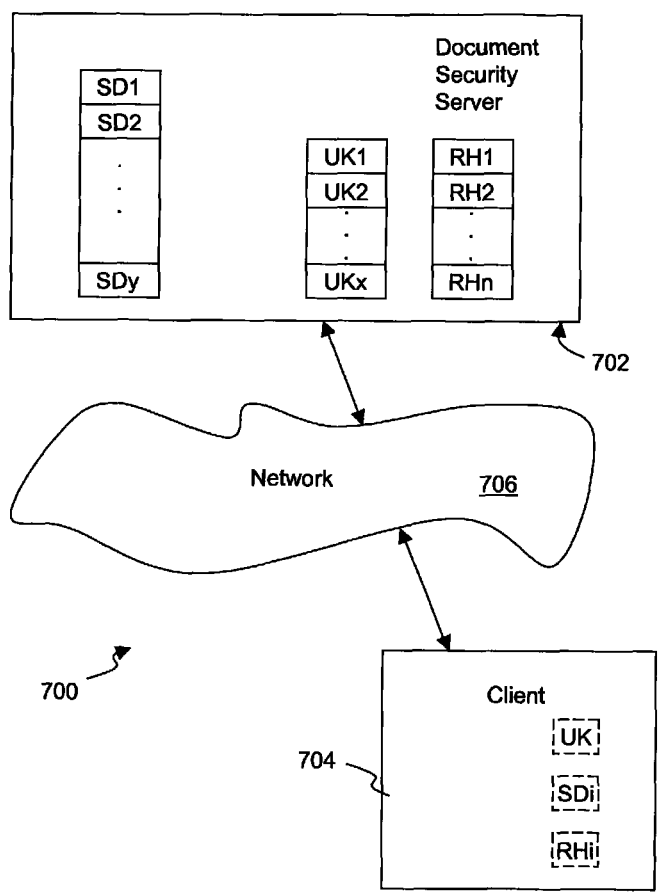
FIG. 7 is a block diagram of a document security system according to one embodiment of the invention.

FIG. 7 is a block diagram of a document security system 700 according to one embodiment of the invention. The document security system 700 includes a document security server 702, a plurality of clients 704, and a network 706. The document security server 702 is a central server that couples to the plurality of clients 704 via the network 706. The network 706 is, for example, a global computer network (e.g., the Internet), a wide area network, or a local area network. The document security server 702 operates to secure documents and then restrict access to such documents. The document security server 702 shown in FIG. 7 depicts management of secured documents (SD1, SD2, . . . , SDy). Additionally, these secured documents utilize remote headers (RH) also managed by the document security server 702. The remote headers can be stored in a list or table, such as RH1, RH2, . . . , RHn. The remote headers store security information that is required in order to gain access to associated secured documents. Each of the secured documents (SD) includes a remote header identifier that points to one of the remote headers. In order to access the security information provided within the remote headers, the client 704 will need to utilize one or more user keys associated with the client 704. The document security server 702 also manages various user keys (UK1, UK2, . . . , UKx) that are utilized by the plurality of clients 704. An authorized user of one of the clients 704 is able to acquire one or more of the user keys depending on their group memberships or other criteria. Typically, the user keys are only usable by the client 704 for a limited period.

When the particular client 704 shown in FIG. 7 desires to access a particular secured document SDi, the client 704 will interact with the document security server 702 to receive the remote header (RHi) associated with the secured document, SDi to be accessed. The client 704 will also have the user keys (UKj and UKk) associated with the user of the client 704. The user keys are typically provided to the client 704 when the user of the client 704 is authenticated with the system during a login process. In order for the user to gain access to the data of the secured document SDi, the user needs to satisfy the access rules and other security information within the remote header RHi. The secured document SDi includes a remote header identifier that points to the remote header RHi. However, in order to gain access to some of this security information, namely, keys provided therein, the client 704 will need to possess the correct user keys in order to decrypt portions of the security information within the remote header RHi.

The document security server 704 manages the remote headers in a centralized fashion and thus facilitates altering of the security information within the remote headers for secured documents, even though one or more of the clients

704 have copies of the secured documents. This is particularly advantageous when access rules are to be changed for particular documents, group memberships are to change, etc. In the case of an enterprise, changes in responsible personnel for various tasks often leads to a need to change how secured documents can be accessed. The document security system 700 permits administrators to easily alter access control for documents that have already been secured and possibly distributed to numerous clients 704.

Figure 8:
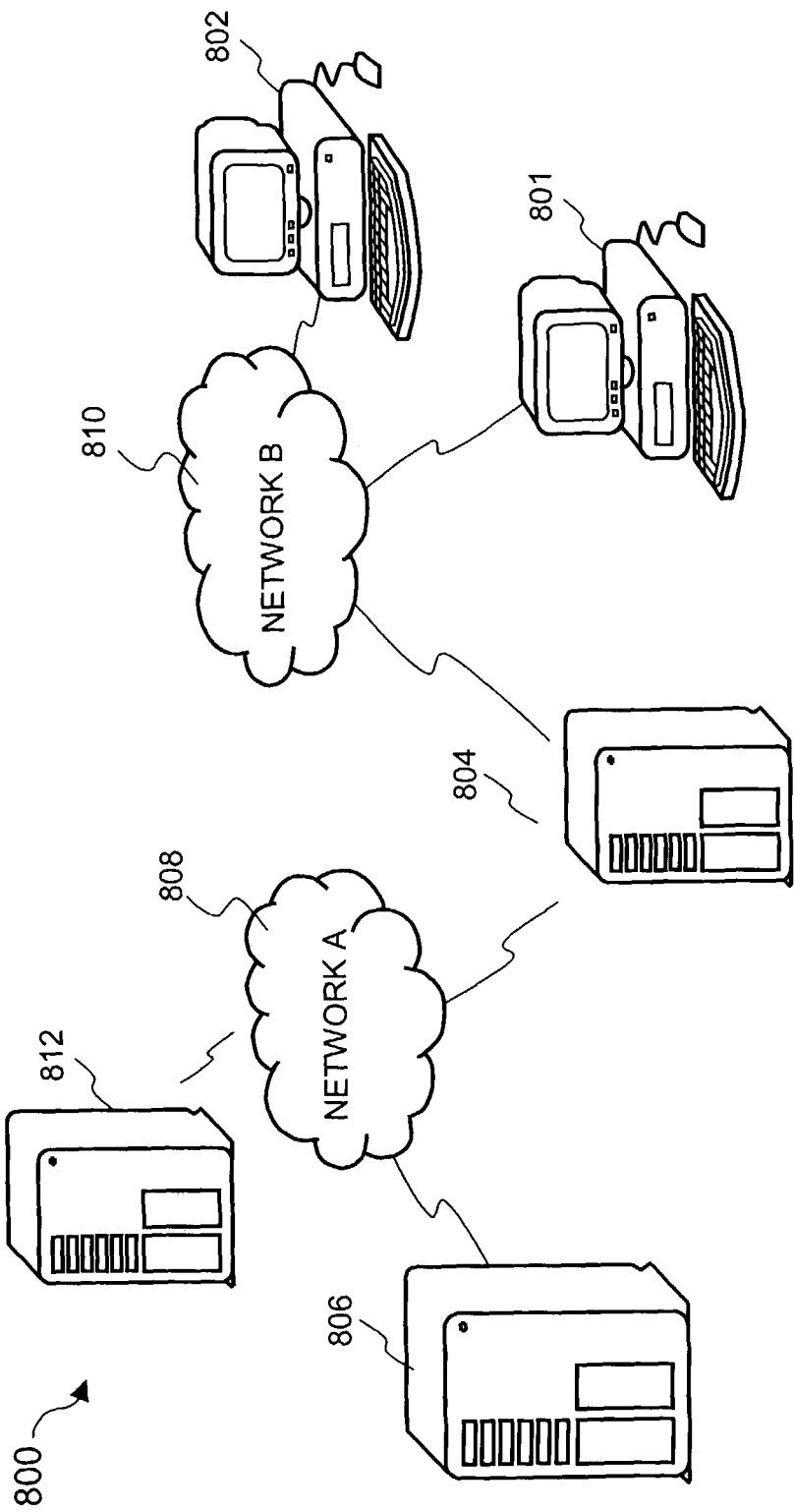
FIG. 8 shows a basic security system in which the invention may be practiced in accordance with one embodiment thereof.

FIG. 8 shows a basic security system 800 in which the invention may be practiced in accordance with one embodiment thereof. The security system 800 may be employed in an enterprise or inter-enterprise environment having a network A 808 and a network B 810. It includes a first server 806 (also referred to as a central server) providing centralized access management for the enterprise. The first server 806 can control restrictive access to files secured by the security system 800. To provide dependability, reliability and scalability of the system, one or more second servers 804 (also referred to as local servers, of which one is shown) may be employed to provide backup or distributed access management for users of client machines serviced locally. For illustration purposes, there are two client machines 801 and 802 being serviced by a local server 804. Alternatively, one of the client machines 801 and 802 may be considered as a networked storage device.

Generally, content created by a creator for the purpose of an entity is an intellectual property belonging to the creator or the entity. In an enterprise, any kind of information or intellectual property can be content, though it is commonly referred to as "information" instead of "content". In either case, content or information is independent of its format. As used herein, content or information exists in a type of electronic data that is also referred to as a digital asset. A representation of the electronic data may include, but not be limited to, various types of documents, multimedia files, streaming data, dynamic or static data, executable code, images and text.

Additional details on a security system can be found in U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated by reference for all purposes.

The invention can be implemented by software, but can also be implemented in hardware or a combination of hardware and software. The invention can also be embodied as computer readable code on a computer readable storage medium. The computer readable storage medium is any data storage device that can store data which can thereafter be read by a computer system. Examples of the computer readable storage medium include read-only memory, random-access memory, CD-ROMs, DVDs, magnetic tape, and optical data storage devices. The computer readable storage medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that improved management capabilities for secured files can be achieved. Another advantage of the invention is that access rights to secured files can be centrally, administratively changed. Still another advantage of the invention is that access rights to secured files can be subsequently altered without having to unsecure and then re-secure the files.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for restricting access to electronic data in a file, the method comprising:
    determining, by a computing device, a remote header identifier for the file, the remote header identifier comprising a pointer or link to a remote header that is maintained at a server machine remote from the file and containing at least a portion of security information related to the file;
    encrypting, by the computing device, the electronic data using a file key;
    encrypting, by the computing device, the file key using a public key associated with the remote header identifier to form an encrypted file key, wherein the encrypted file key is needed to decrypt the electronic data;
    forming, by the computing device, a secured file, the secured file including:
        a header portion, including at least the remote header identifier and the encrypted file key; and
        a data portion, including at least the encrypted electronic data; and
    retaining the secured file in place of the file;
    wherein the security information comprises a private key corresponding to the public key and access rules indicating one or more user groups entitled to access the file and at least one of a location or a time the one or more user groups are entitled to access the file, and wherein the private key is used to decrypt the encrypted file key, and wherein the server machine is configured to alter the security information in the remote header without changing the secured file.

2. The method as recited in claim 1, wherein the determining the remote header identifier comprises determining the remote header identifier based on a category type associated with the electronic data.

3. The method as recited in claim 1, further comprising, before encrypting the electronic data, generating the file key for the electronic data to be secured.

4. The method as recited in claim 3, wherein the file key is randomly generated for the electronic data to be secured.

5. The method as recited in claim 1, wherein the server machine stores a plurality of remote headers, and wherein at least one of the plurality of remote headers is used by at least one other file other than the secured file.

6. The method as recited in claim 1, wherein the remote header is stored in a database and retrieved via the server machine, and wherein the database is operatively coupled to or is a part of the server machine.

7. The method as recited in claim 1, wherein the security information employs an access rule.

8. The method as recited in claim 1, wherein the security information employs a remote header private key encrypted by a public key.

9. The method of claim 1, wherein the private key is encrypted by a group or user key.

10. A method for accessing a secured electronic file, the method comprising:
obtaining a remote header identifier from a header portion of the secured electronic file, wherein the remote header identifier comprises a pointer or link to a remote header maintained at a server machine remote from the secured electronic file;
receiving, from the server machine, the remote header that corresponds to the remote header identifier and contains at least a portion of security information related to the secured electronic file, wherein the remote header is uniquely associated with the secured electronic file, and wherein the server machine is configured to alter the security information in the remote header without changing the secured electronic file;
obtaining an encrypted file key from the header portion of the secured electronic file;
decrypting the encrypted file key using a cipher key associated with the remote header identifier to obtain a file key, wherein the security information comprises the cipher key and access rules indicating one or more user groups entitled to access the secured electronic file and at least one of a location or a time the one or more user groups are entitled to access the secured electronic file; and
decrypting encrypted data within a data portion of the secured electronic file using the file key.

11. The method as recited in claim 10, wherein said method operates on a client machine that couples to the server machine over a network.

12. The method as recited in claim 10, wherein the server machine stores a plurality of remote headers, and wherein at least one of the plurality of remote headers is used by at least a second secured electronic file.

13. The method as recited in claim 12, wherein the server machine includes at least a header database that stores the plurality of remote headers.

14. The method as recited in claim 10, wherein said cipher key comprises a private key used to decrypt the encrypted file key to obtain the file key.

15. The method as recited in claim 10, wherein said decrypting the encrypted file key comprises using a key to decrypt a key block within the remote header that encrypts the file key.

16. The method as recited in claim 10, wherein said method is performed by a file security system, wherein the secured electronic file is to be accessed by a requestor, and wherein said method denies the requestor access to the secured electronic file if the requestor is not authenticated by the file security system.

17. The method as recited in claim 16, wherein said method is performed by a client machine of the file security system.

18. A method for restricting access to a document, the method comprising:
retrieving a remote header identifier associated with a category for the document, the remote header identifier comprising a pointer or link to a remote header maintained at a server machine remote from the document, and wherein the remote header contains at least a portion of security information related to the document;
encrypting, using an electronic processor, a data portion of the document using a file key to obtain encrypted data;
encrypting the file key using a public key associated with the remote header identifier to obtain an encrypted file key;
producing a secured document, the secured document including at least the remote header identifier, the encrypted file key and the encrypted data; and
retaining the secured document in place of the document;
wherein the security information comprises a private key corresponding to the public key and access rules indicating one or more user groups entitled to access the document and at least one of a location or a time the one or more user groups are entitled to access the document, and wherein the private key is used to decrypt the encrypted file key, and wherein the server machine is configured to alter the security information in the remote header without changing the secured document.

19. The method as recited in claim 18, wherein the file key is particular to the document.

20. The method as recited in claim 18, wherein the category for the document is related to a folder in which the document resides.

21. The method as recited in claim 18, wherein the secured document has a header portion and a data portion, and wherein said producing the secured document comprises:
integrating the remote header identifier and the encrypted file key to the header portion of the secured document; and
integrating the encrypted data to the data portion of the secured document.

22. A non-transitory computer-readable storage medium having instructions stored thereon, the instructions comprising:
instructions to determine a remote header identifier for a file, the remote header identifier comprising a pointer or link to a remote header that is maintained at a server remote from the file and containing at least a portion of security information related to the file;
instructions to encrypt the electronic data using a file key;
instructions to encrypt the file key using a public key associated with the remote header identifier;
instructions to form a secured file, the secured file including at least a header portion including at least the remote header identifier, the encrypted file key, and a data portion including at least the encrypted electronic data; and
instructions to retain the secured file in place of the file;
wherein the security information comprises a private key corresponding to the public key and access rules indicating one or more user groups entitled to access the secured file and at least one of a location or a time the one or more user groups are entitled to access the secured file, and wherein the private key is used to decrypt the encrypted file key, and wherein the server is configured to alter the security information in the remote header without changing the secured file.

23. An article of manufacture including a non-transitory computer-readable storage medium having instructions stored thereon, that, if executed by a computing device, cause the computing device to perform operations comprising:
obtaining a remote header identifier from a header portion of a secured electronic file, wherein the remote header identifier comprises a pointer or link to a remote header maintained at a server remote from the secured electronic file;
receiving, from the server, a remote header that corresponds to the remote header identifier and contains at least a portion of security information related to the secured electronic file, wherein the remote header is uniquely associated with the secured electronic file;
obtaining an encrypted file key from the header portion of the secured electronic file;

decrypting the encrypted file key using a cipher key associated with the remote header identifier to obtain a file key, wherein the security information comprises the cipher key and access rules indicating one or more user groups entitled to access the secured file and at least one of a location or a time the one or more user groups are entitled to access the secured file; and decrypting encrypted data within a data portion of the secured electronic file using the file key;

wherein the server is configured to alter the security information in the remote header without changing the secured electronic file.

24. A file security system, comprising:

a header manager configured to restrict access to headers for electronic files protected by said file security system; and a header database operatively connected to said header manager, said header database configured to store the headers, wherein each of the headers is uniquely associated with an electronic file, is identified by a header identifier, contains at least a portion of security information related to the electronic file, and is maintained at a server remote from the electronic file, wherein upon unsecuring a previously secured file, said file security system retrieves a particular header from said header database via said header manager, the particular header being identified by a particular header identifier provided in the previously secured file, the particular header identifier comprising a pointer or link to the particular header, wherein said file security system is configured to evaluate, using a computing device, whether to permit a requestor to access the previously secured file based on security information contained in the particular header that is identified by the particular header identifier;

wherein the security information comprises a cipher key and access rules indicating one or more user groups entitled to access the previously secured file and at least one of a location or a time the one or more user groups are entitled to access the previously secured file, wherein the cipher key is configured to decrypt an encrypted file key used in securing the previously secured file, and wherein the cipher key is associated with the particular header identifier, and wherein the header manager is configured to alter the security information in the particular header without changing the previously secured file.

25. A non-transitory computer-readable storage medium having instructions stored thereon, the instructions comprising:

instructions to retrieve a remote header identifier associated with a category for the document, the remote header identifier comprising a pointer or link to a remote header that is maintained at a server remote from the document and contains at least a portion of security information related to the document;

instructions to encrypt, using an electronic processor, a data portion of the document using a file key to obtain encrypted data;

instructions to encrypt the file key using a public key associated with the remote header identifier to obtain an encrypted file key;

instructions to produce a secured document, the secured document including at least the remote header identifier, the encrypted file key and the encrypted data; and instructions to retain the secured document in place of the document, wherein the security information comprises a private key corresponding to the public key and access rules indicating one or more user groups entitled to access the document and at least one of a location or a time the one or more user groups are entitled to access the document, and wherein the private key is used to decrypt the encrypted file key;

wherein the server is configured to alter the security information in the remote header without changing the secured document.

26. A system for restricting access to electronic data in a file, the system comprising:

a computing device;

wherein the computing device is configured to determine a remote header identifier for the file, the remote header identifier comprising a pointer or link to a remote header that is maintained at a server remote from the file and containing at least a portion of security information related to the file;

wherein the computing device is further configured to encrypt the electronic data using a file key;

wherein the computing device is further configured to encrypt the file key using a public key associated with the remote header identifier;

wherein the computing device is further configured to form a secured file, the secured file including at least a header portion including at least the remote header identifier and the encrypted file key and a data portion including at least the encrypted electronic data;

wherein the computing device is further configured to retain the secured file in place of the file, wherein the security information comprises a private key corresponding to the public key and access rules indicating one or more user groups entitled to access the file and at least one of a location or a time the one or more user groups are entitled to access the file, and wherein the private key is used to decrypt the encrypted file key; and wherein the computing device is further configured to alter the security information in the remote header without changing the secured file.

27. A system for accessing a secured electronic file, the system comprising:

a computing device;

wherein the computing device is configured to obtain a remote header identifier from a header portion of the secured electronic file, the remote header identifier comprising a pointer or link to a remote header maintained at a server remote from the secured electronic file;

wherein the computing device is further configured to receive, from the server, a remote header that corresponds to the remote header identifier and contains at least a portion of security information related to the secured electronic file, wherein the remote header is uniquely associated with the secured electronic file;

wherein the computing device is further configured to obtain an encrypted file key from the header portion of the secured electronic file;

wherein the computing device is further configured to decrypt the encrypted file key using a public key associated with the remote header identifier to obtain a file key;

wherein the computing device is further configured to decrypt encrypted data within a data portion of the secured electronic file using the file key, wherein the security information comprises a private key corresponding to the public key and access rules indicating one or more user groups entitled to access the secured electronic file and at least one of a location or a time the one or more user groups are entitled to access the secured electronic file, and wherein the private key is used to decrypt the encrypted file key; and wherein the computing device is further configured to alter the security information in the remote header without changing the secured electronic file.

28. A system for restricting access to a document, the system comprising:

a computing device;

wherein the computing device is configured to retrieve a remote header identifier associated with a category for the document, the remote header identifier comprising a pointer or link to a remote header maintained at a server remote from the document that contains at least a portion of security information related to the document;

wherein the computing device is further configured to encrypt a data portion of the document using a file key to obtain encrypted data;

wherein the computing device is further configured to encrypt the file key using a public key associated with the remote header identifier to obtain an encrypted file key;

wherein the computing device is further configured to produce a secured document, the secured document including at least the remote header identifier, the encrypted file key and the encrypted data;

wherein the computing device is further configured to retain the secured document in place of the document, wherein the security information comprises a private key corresponding to the public key and access rules indicating one or more user groups entitled to access the document and at least one of a location or a time the one or more user groups are entitled to access the document, and wherein the private key is used to decrypt the encrypted file key; and wherein the computing device is further configured to alter the security information in the remote header without changing the secured document.

\* \* \* \* \*